United States Patent
Terada et al.

(10) Patent No.: US 6,873,436 B1
(45) Date of Patent: Mar. 29, 2005

(54) IMAGE PROCESSING DEVICE AND RECORDING MEDIUM

(75) Inventors: Yoshihiro Terada, Ebina (JP); Alan Filipski, Phoenix, AZ (US); Marvin T. Ling, Phoenix, AZ (US)

(73) Assignees: Fuji Xerox Co., Ltd., Tokyo (JP); GTX Corporation, Phoenix, AZ (US)

( * ) Notice: Subject to any disclaimer, the term of this patent is extended or adjusted under 35 U.S.C. 154(b) by 922 days.

(21) Appl. No.: 09/655,314

(22) Filed: Sep. 5, 2000

(51) Int. Cl.[7] .............................. B41B 1/00; G03F 3/08; H04N 1/46; G06K 9/00

(52) U.S. Cl. ...................... 358/1.9; 358/518; 358/540; 382/167

(58) Field of Search .................. 358/1.9, 518, 523, 358/538, 540, 1.17, 1.2, 2.1, 296; 352/38; 382/167, 308, 176, 118; 348/448, 616; 345/593, 597; 375/240.1

(56) References Cited

U.S. PATENT DOCUMENTS

| | | | | |
|---|---|---|---|---|
| 4,606,625 A | * | 8/1986 | Geshwind | 352/38 |
| 4,720,745 A | * | 1/1988 | DeForest et al. | 348/448 |
| 5,050,984 A | * | 9/1991 | Geshwind | 352/38 |
| 5,202,933 A | * | 4/1993 | Bloomberg | 382/176 |
| 5,220,620 A | * | 6/1993 | Nakano et al. | 382/167 |
| 5,504,846 A | * | 4/1996 | Fisher | 345/597 |
| 5,598,184 A | * | 1/1997 | Barkans | 345/597 |
| 5,905,579 A | * | 5/1999 | Katayama et al. | 358/296 |
| 6,031,572 A | * | 2/2000 | Christopoulos | 375/240.1 |
| 6,094,232 A | * | 7/2000 | Bayazit et al. | 348/616 |
| 6,172,766 B1 | * | 1/2001 | Honma | 358/1.2 |
| 6,574,008 B1 | * | 6/2003 | Yokose et al. | 358/1.17 |
| 6,611,613 B1 | * | 8/2003 | Kang et al. | 382/118 |
| 6,674,925 B1 | * | 1/2004 | Schoepflin et al. | 382/308 |

FOREIGN PATENT DOCUMENTS

| | | | | |
|---|---|---|---|---|
| JP | 10-34183 | * | 12/1998 | |
| JP | 2002142128 A | * | 5/2002 | H04N/1/60 |

OTHER PUBLICATIONS

Wu, Jing; Colour Adviser; Mar. 7, 2002; USPTO; US 2002/0027561 A1.*

Nishida, Hirobumi; Image Processing Apparatus, Image Processing Program and Storage Medium Storing the Program; Sep. 25, 2003; USPTO; US 2003/0179409 A1.*

* cited by examiner

Primary Examiner—Madeleine Nguyen
(74) Attorney, Agent, or Firm—Oliff & Berridge, PLC

(57) ABSTRACT

An image processing apparatus and a recording medium which can improve the quality of a color document image are provided. An input image is converted into an image having low resolution. A subtractive color image is generated using the converted image having low resolution. From the subtractive color image, adjacent pixels which are allocated to the same representative color are unified so as to extract an FCR (Flat Color Region) candidate region. A region candidate is redetermined using an image having resolution which is higher than the subtractive color image. Next, a boundary of the FCR is detected and an ultimate FCR is determined. Selection of a representative color of the determined FCR is carried out, and a specific color processing which replaces a color which is close to a pure color with the pure color is effected. Finally, image regeneration is carried out by overwriting and drawing (synthesizing) the FCR on the input image.

16 Claims, 45 Drawing Sheets

F I G. 1
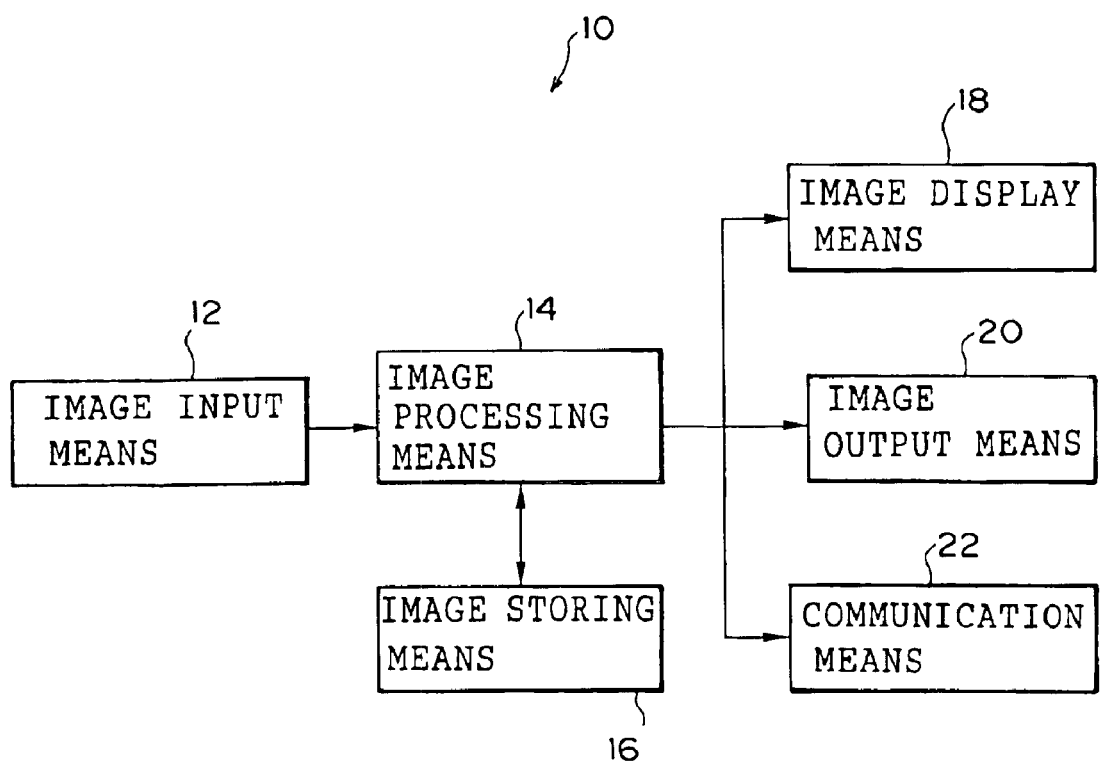

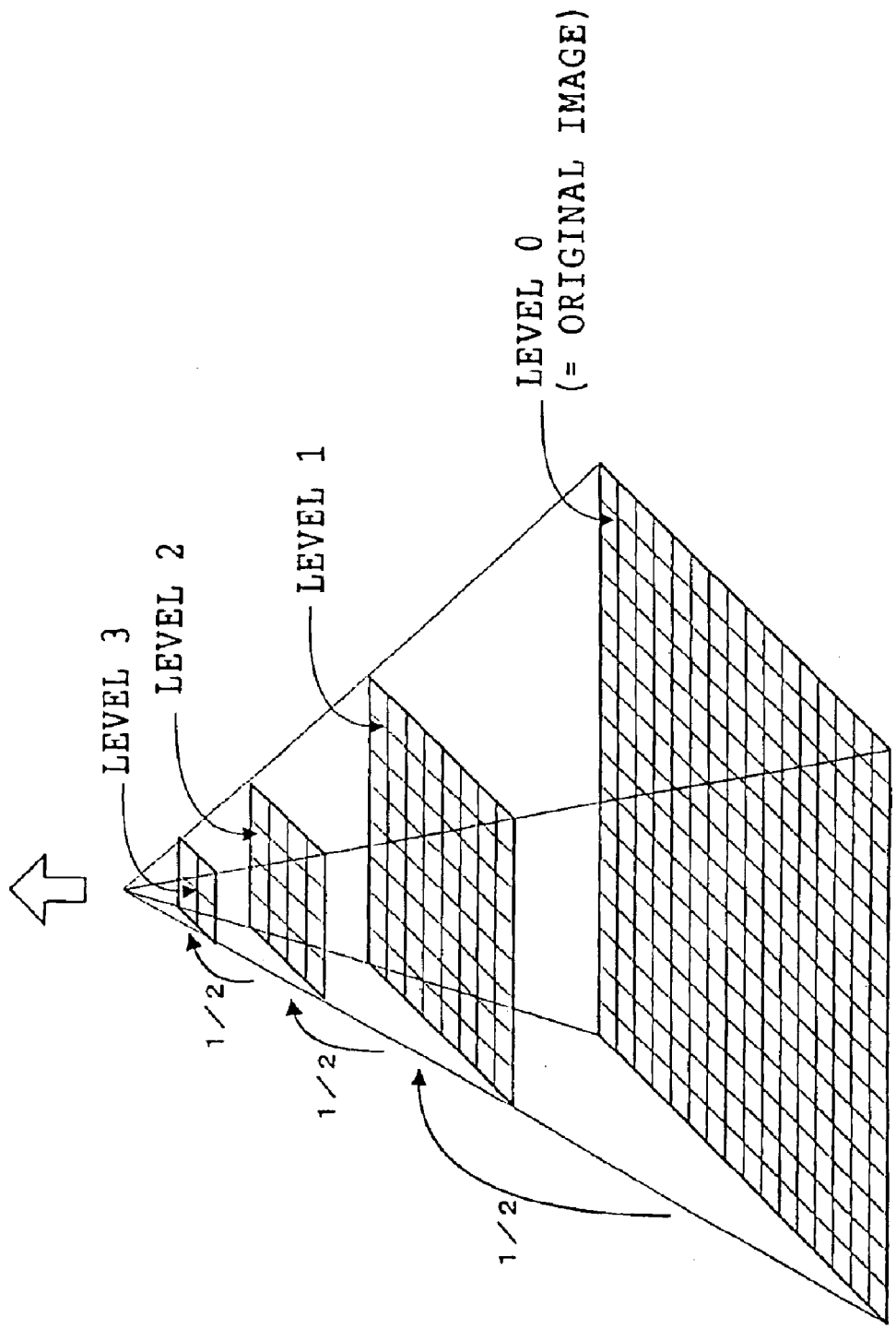

FIG. 5

| LEVEL | CHARACTER | PATTERN | FCR |
|---|---|---|---|
| HIGH ⇕ MEDIUM ⇕ LOW | FLAT PORTION SMALL NUMBER OF COLORS ⇕ DOT ELEMENT SMALL NUMBER OF COLORS ⇕ EDGE ELEMENT SMALL NUMBER OF COLORS | EDGE ELEMENT LARGE NUMBER OF COLORS ⇕ EDGE ELEMENT LARGE NUMBER OF COLORS ⇕ DOT ELEMENT MEDIUM NUMBER OF COLORS | EDGE ELEMENT MEDIUM NUMBER OF COLORS ⇕ FLAT PORTION SMALL NUMBER OF COLORS ⇕ DOT ELEMENT MEDIUM NUMBER OF COLORS |

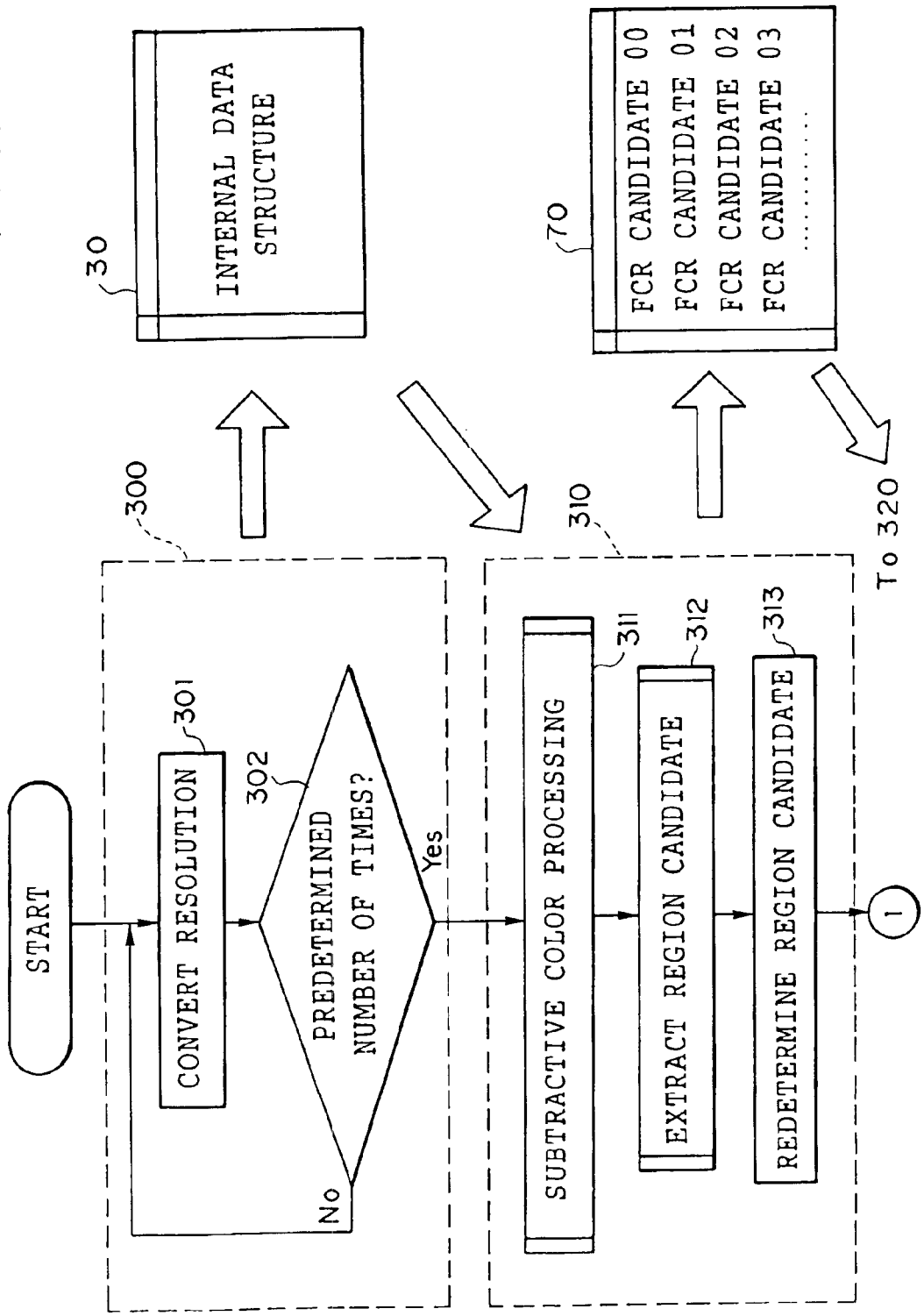

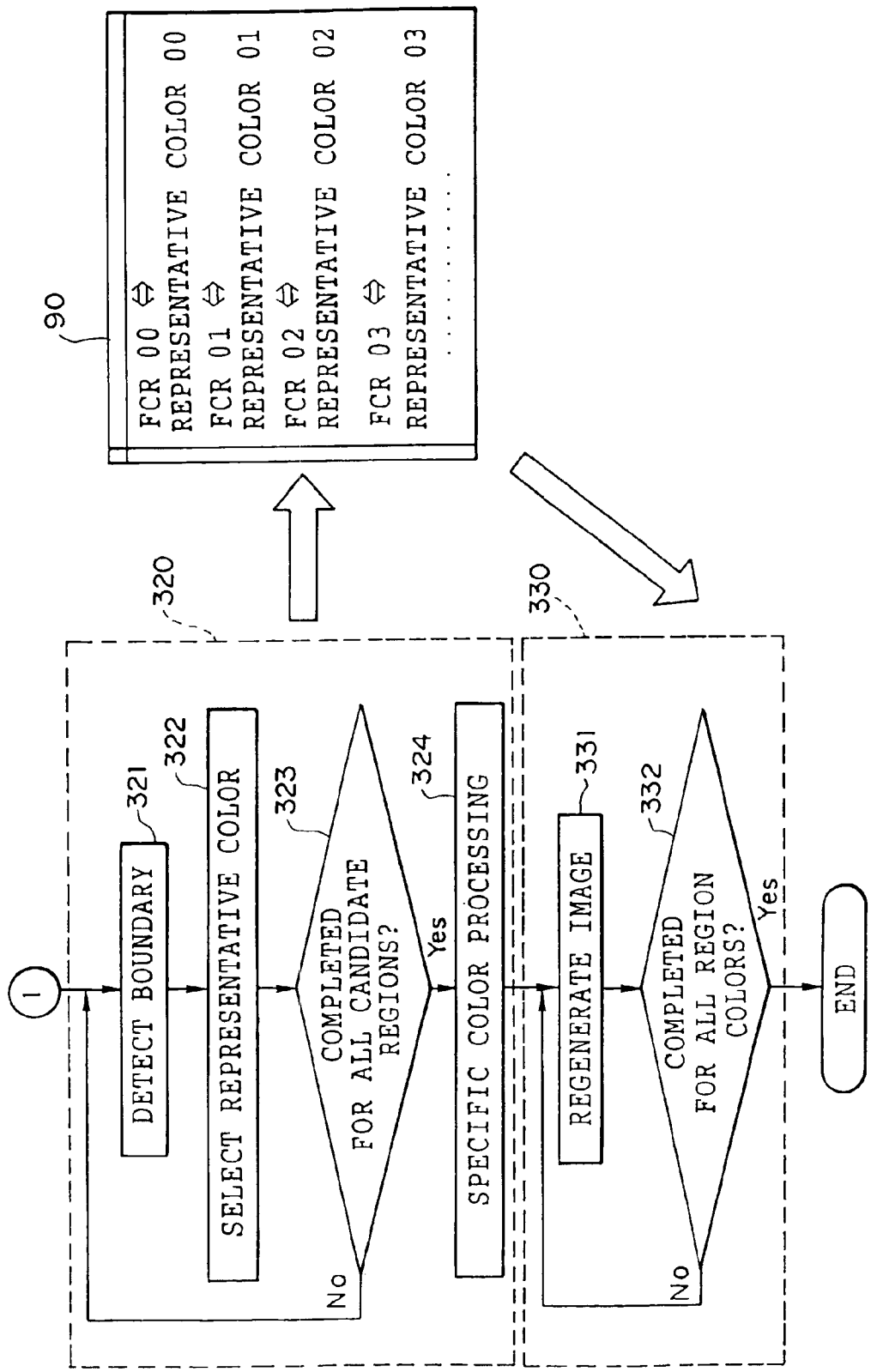
FIG. 7 CONTINUE

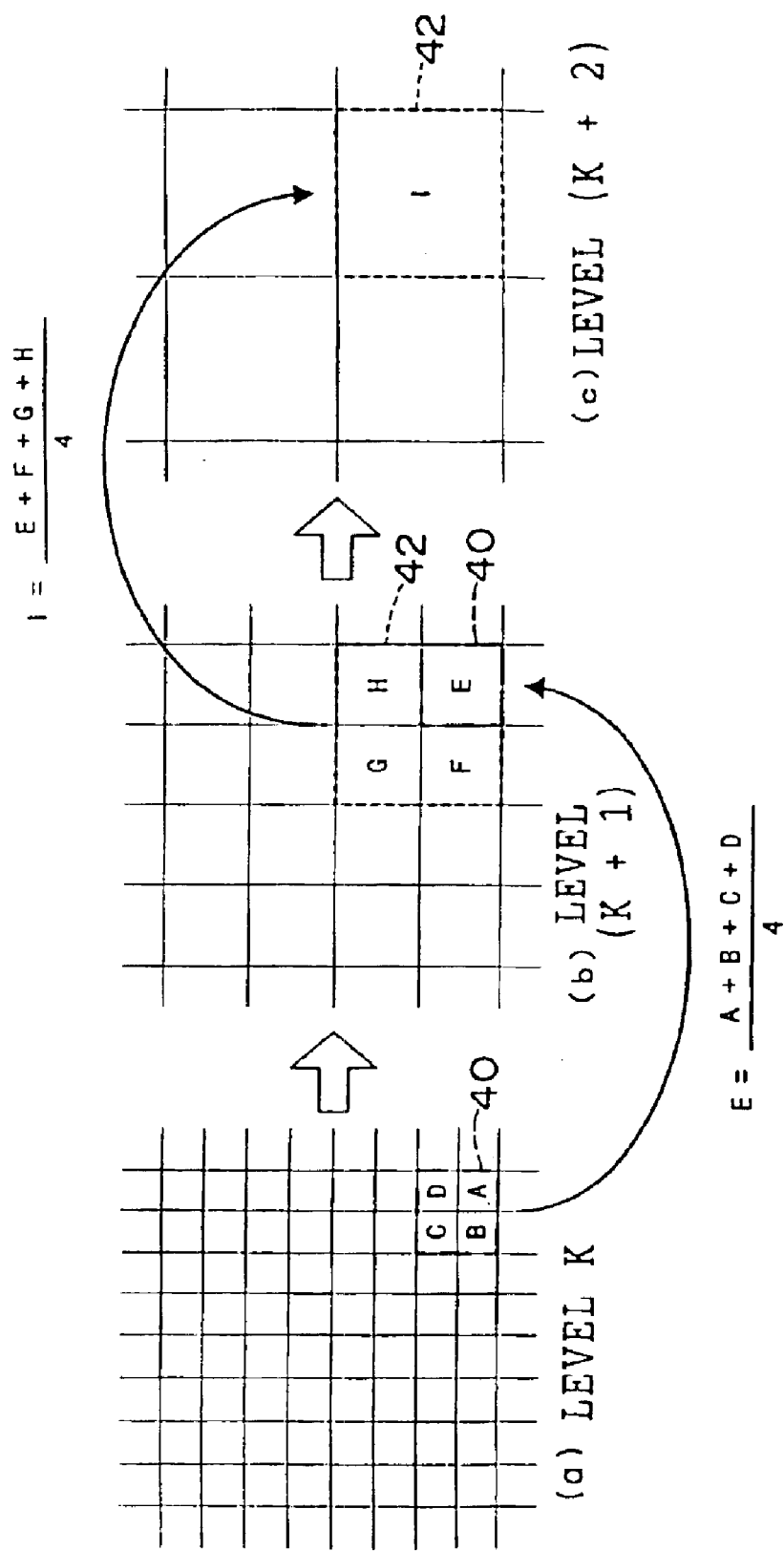

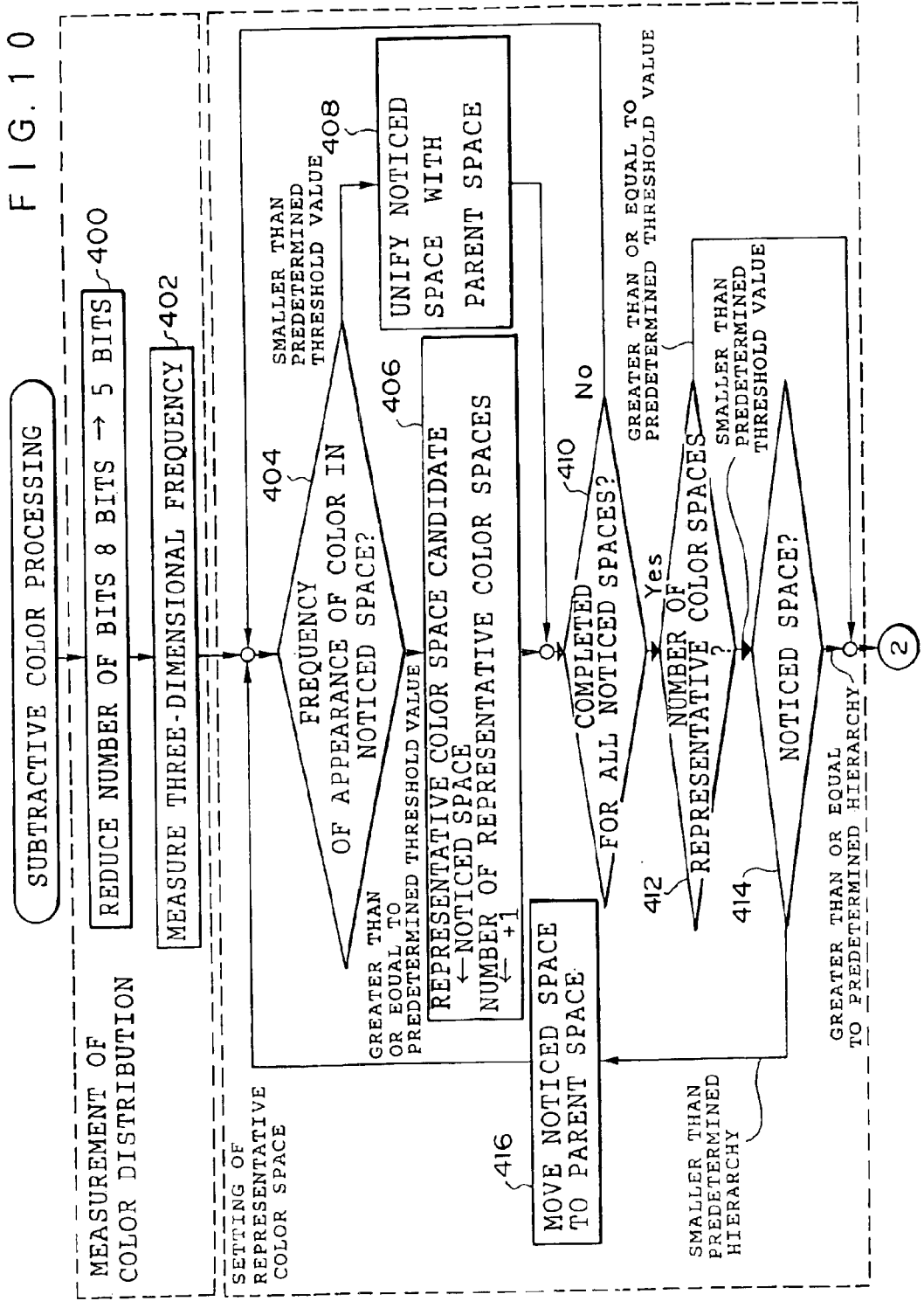

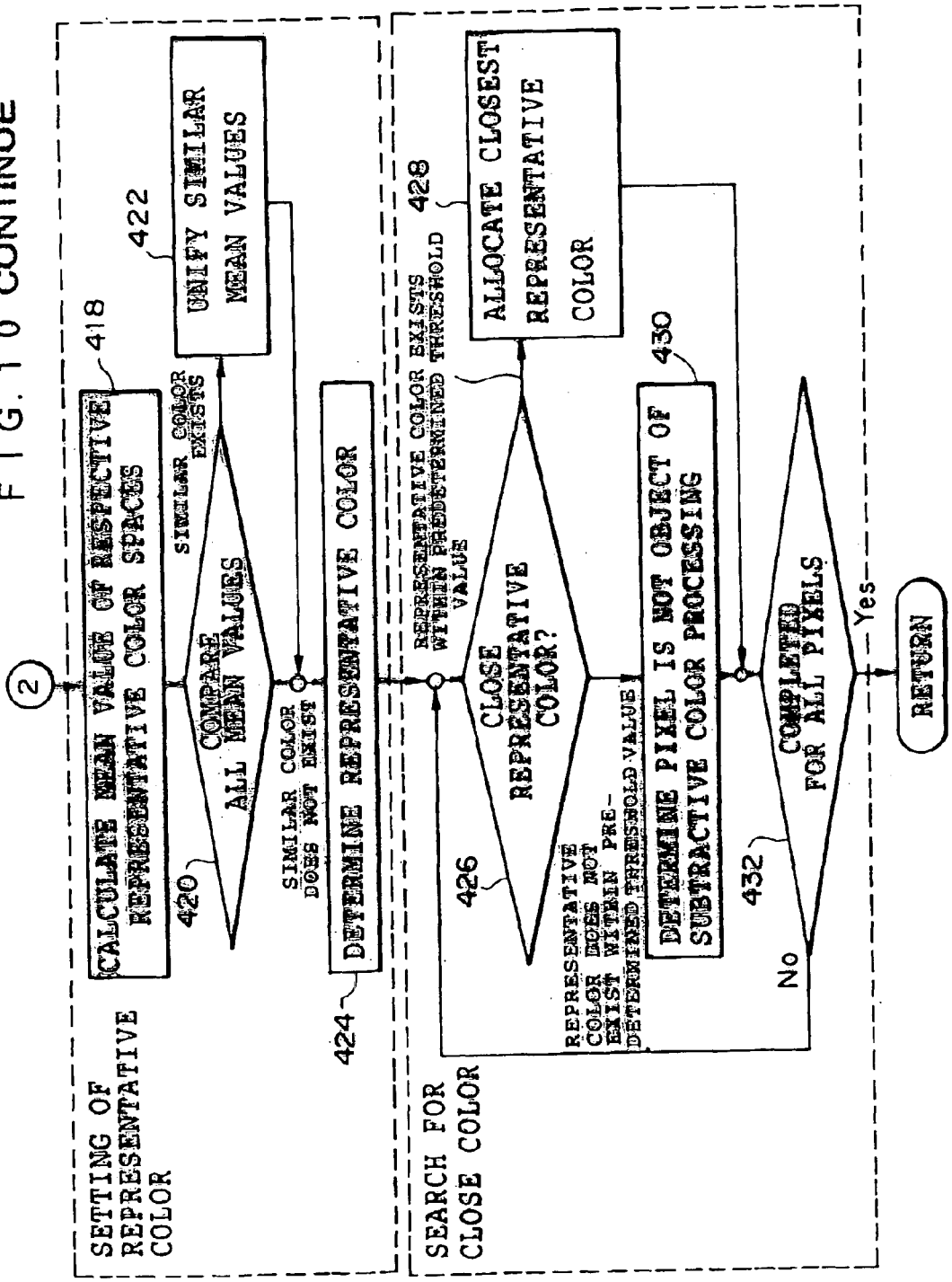

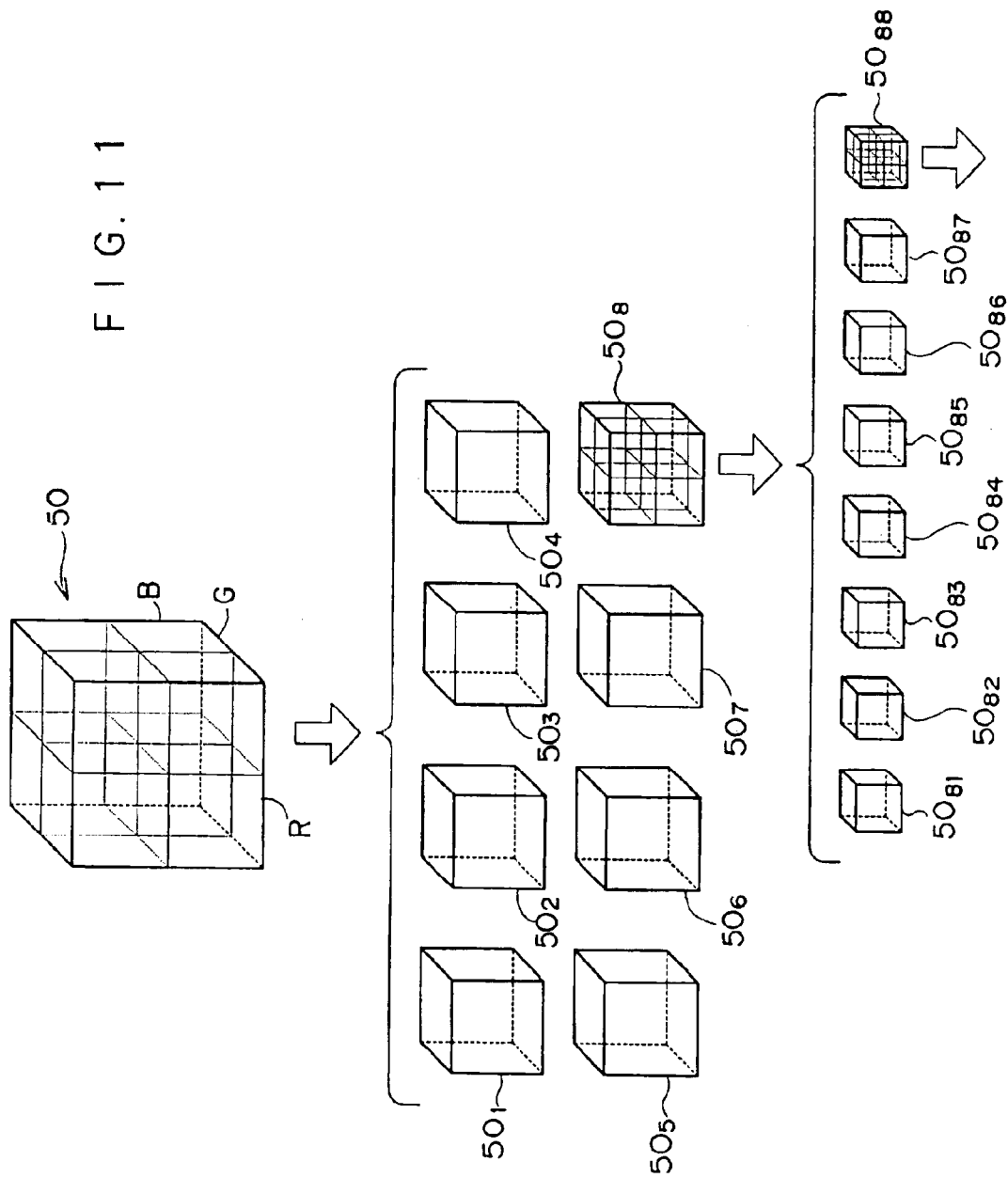

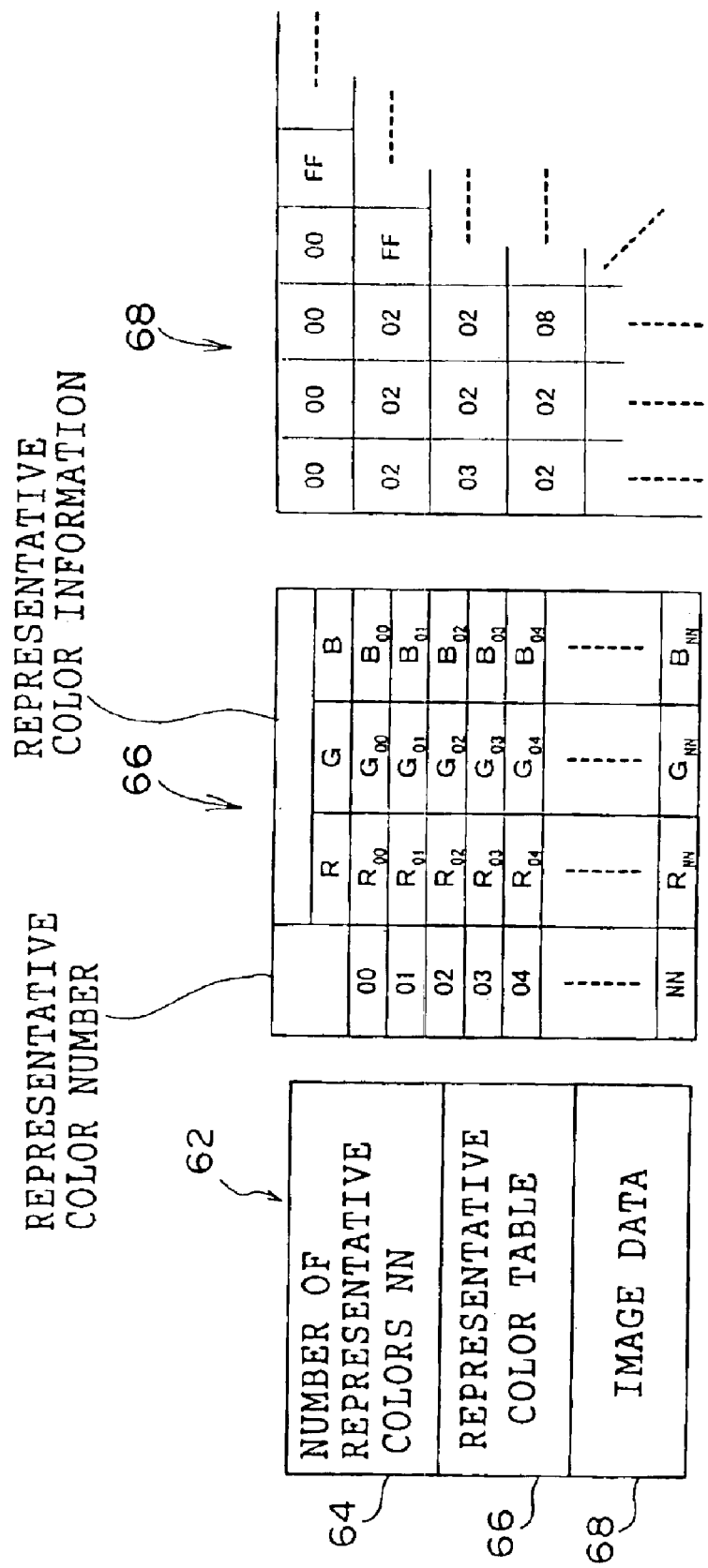

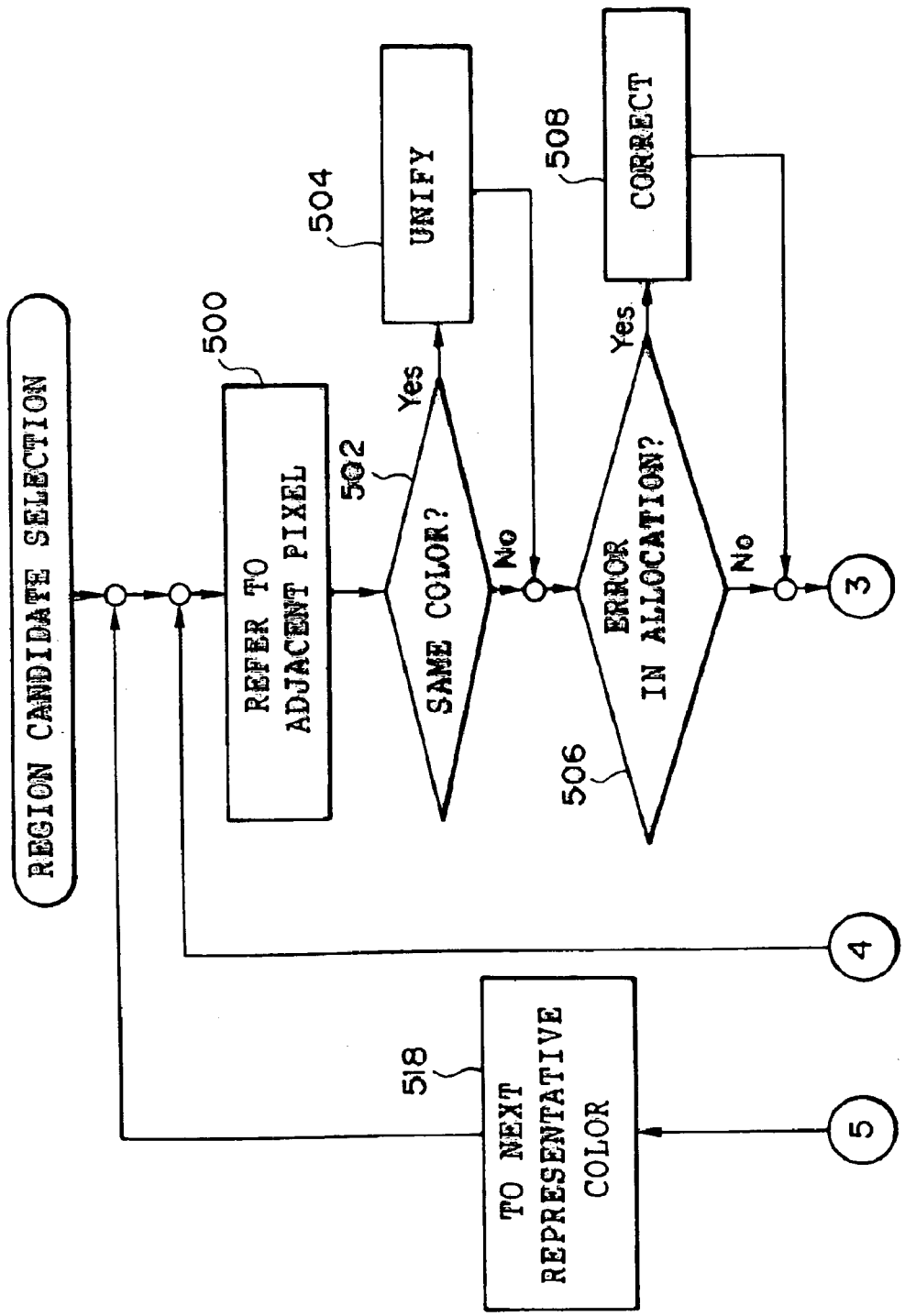

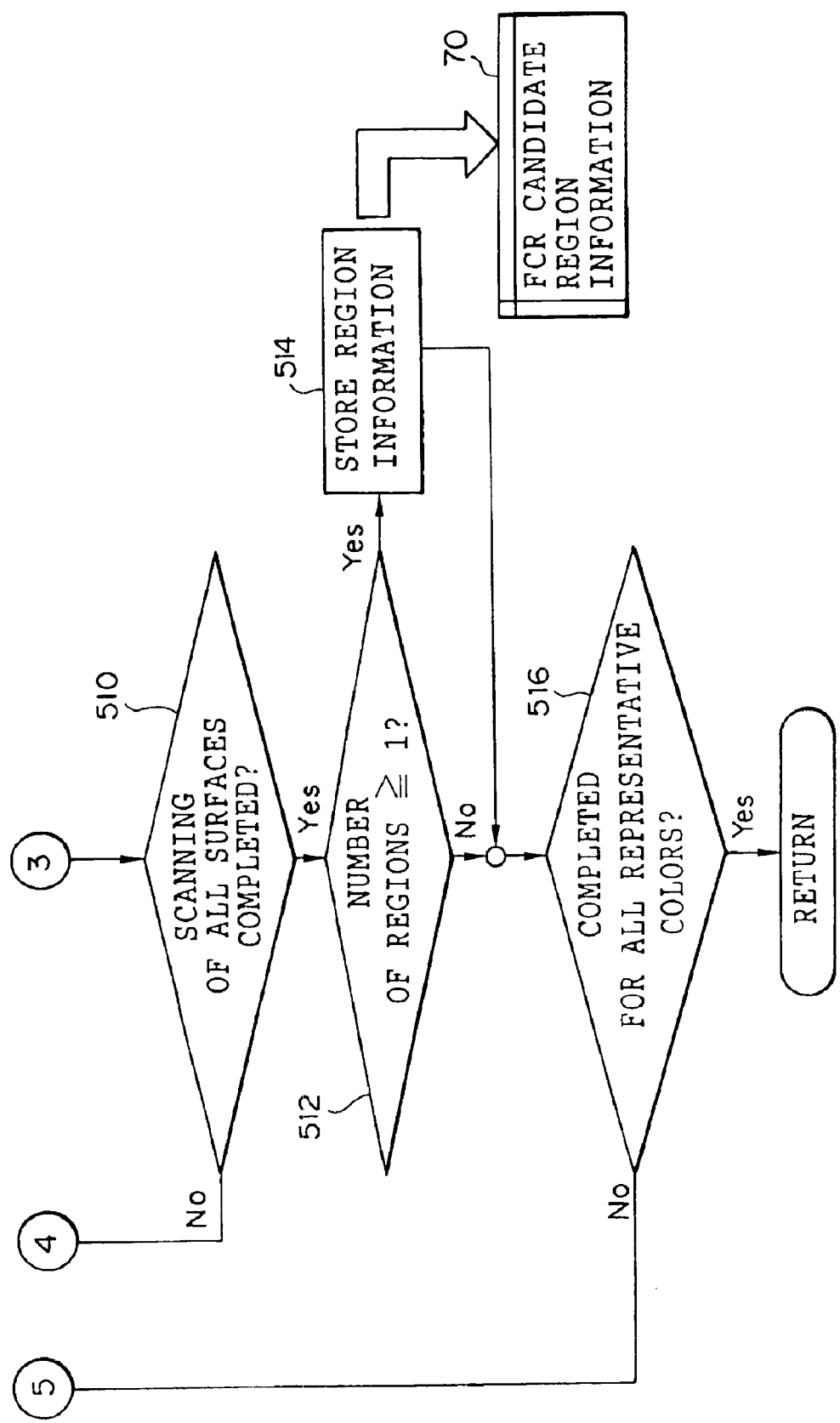
FIG. 14 CONTINUE

F I G. 1 7 A
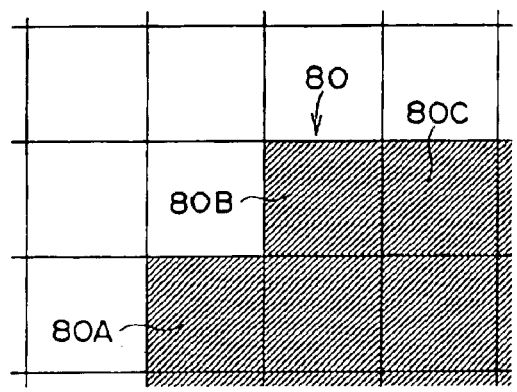
F I G. 1 7 B
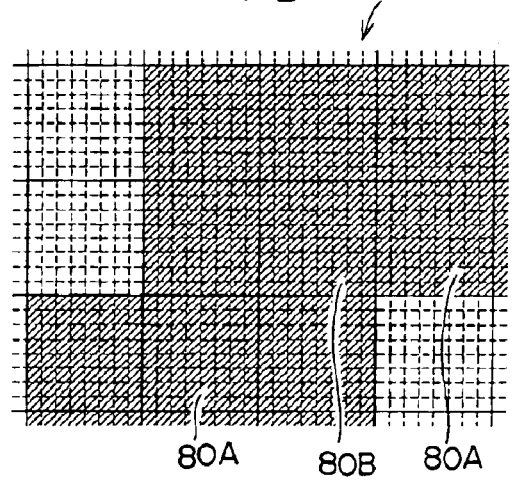
F I G. 1 7 C
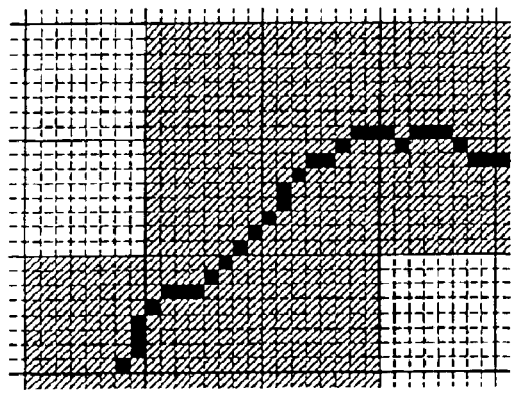
F I G. 1 7 D
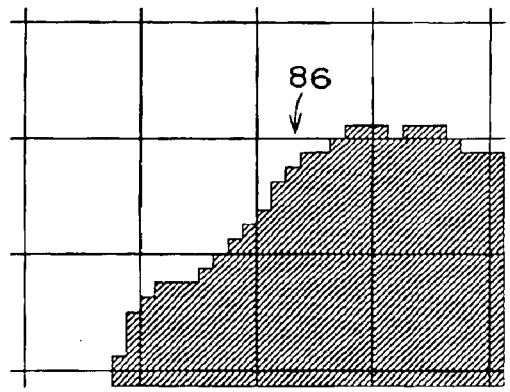

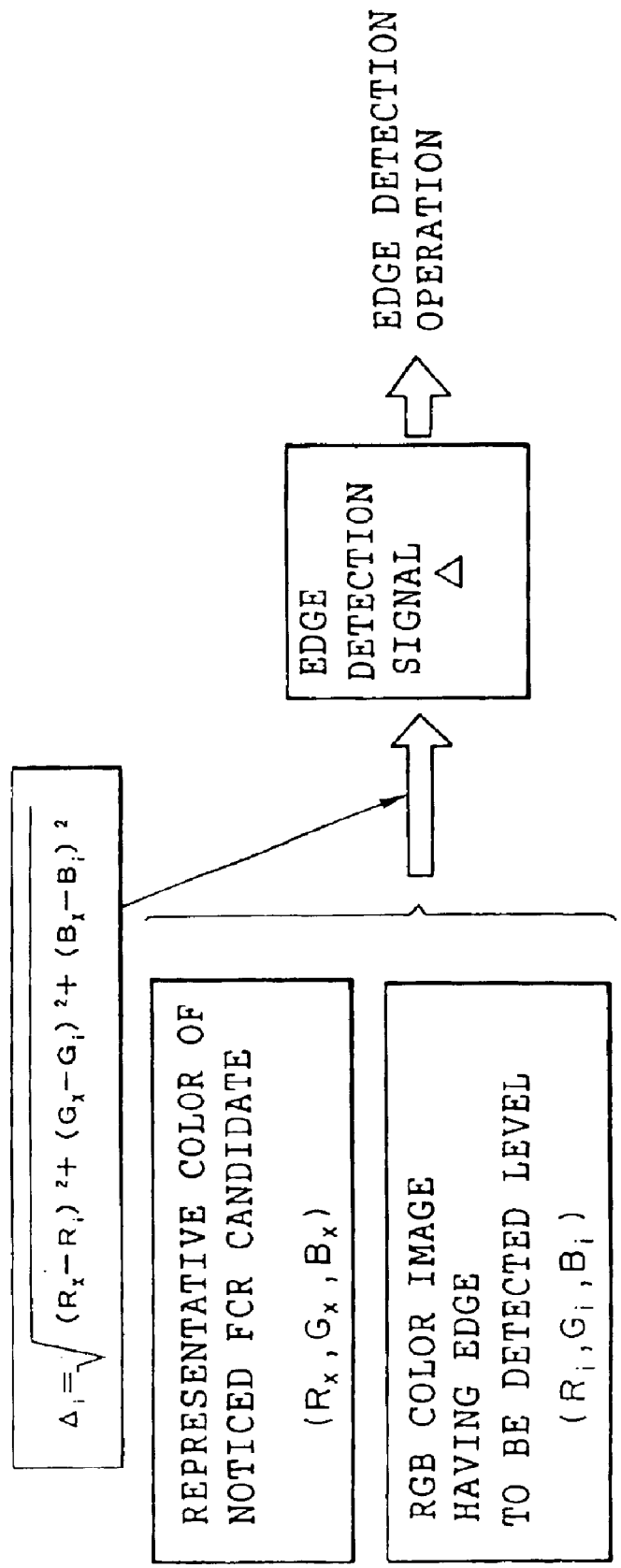

F I G. 1 9
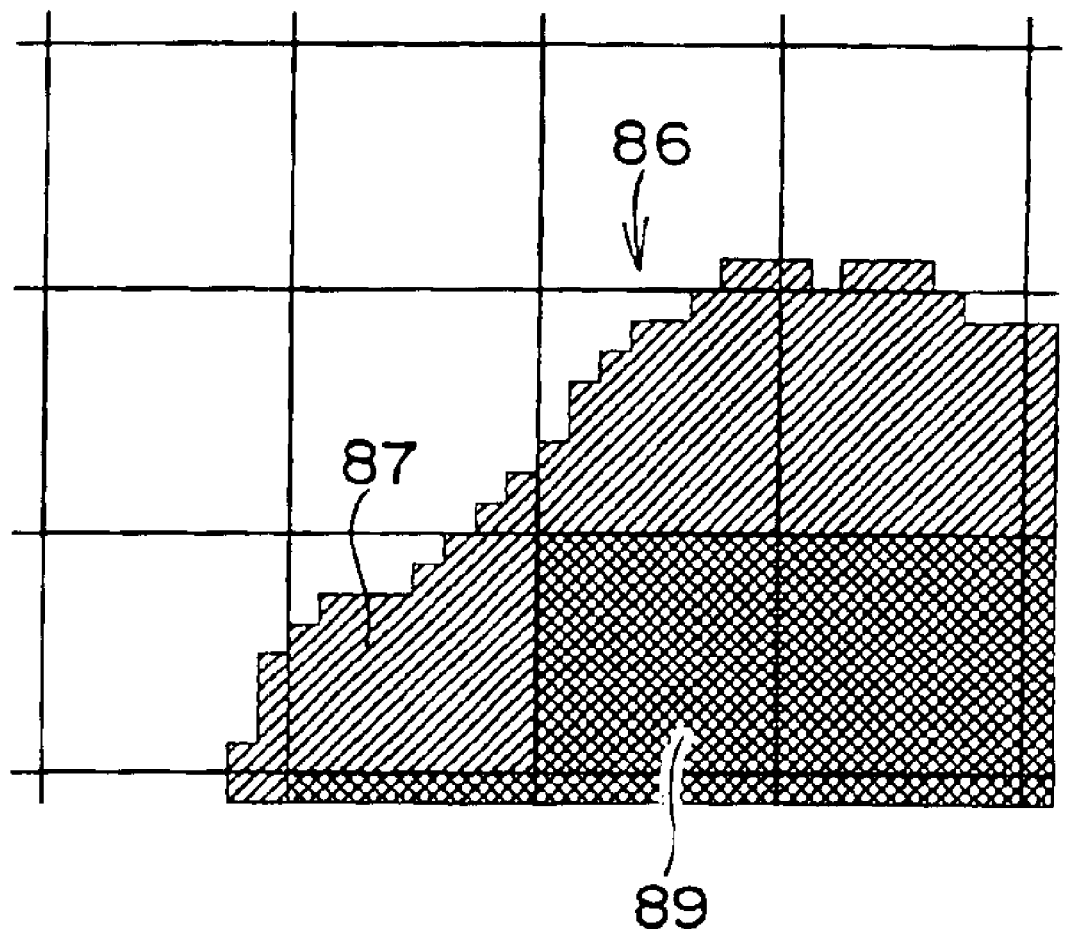

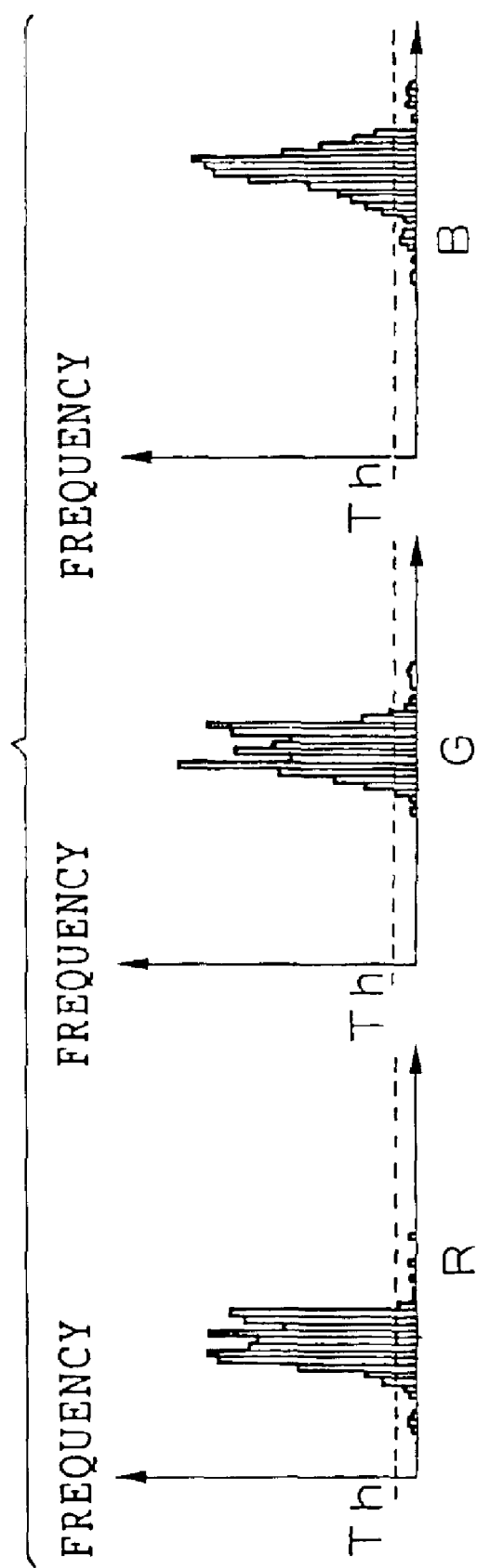

F I G. 2 1
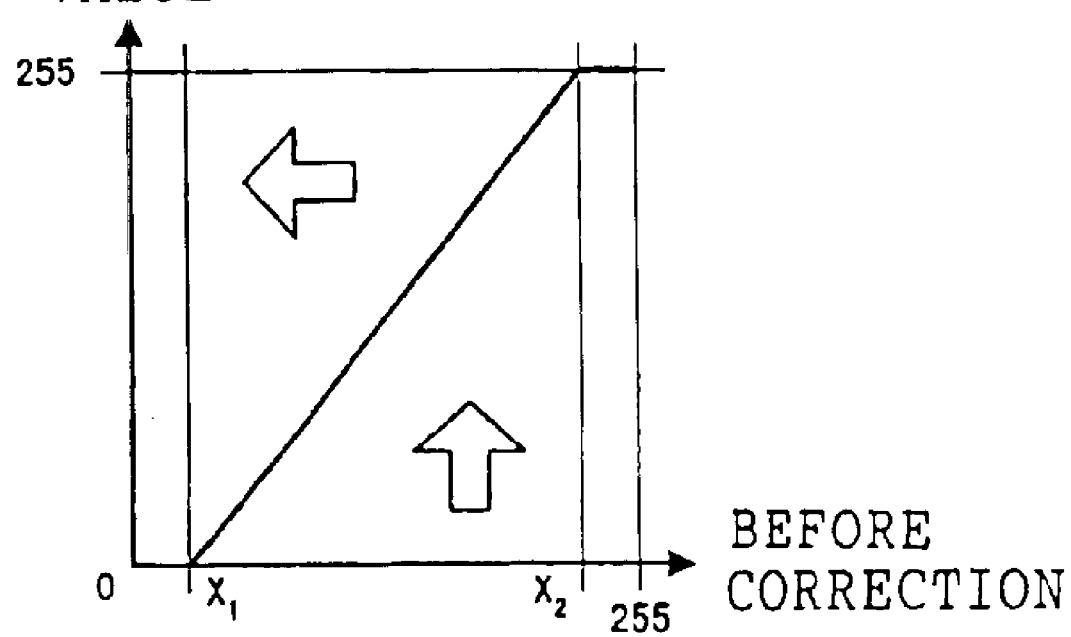

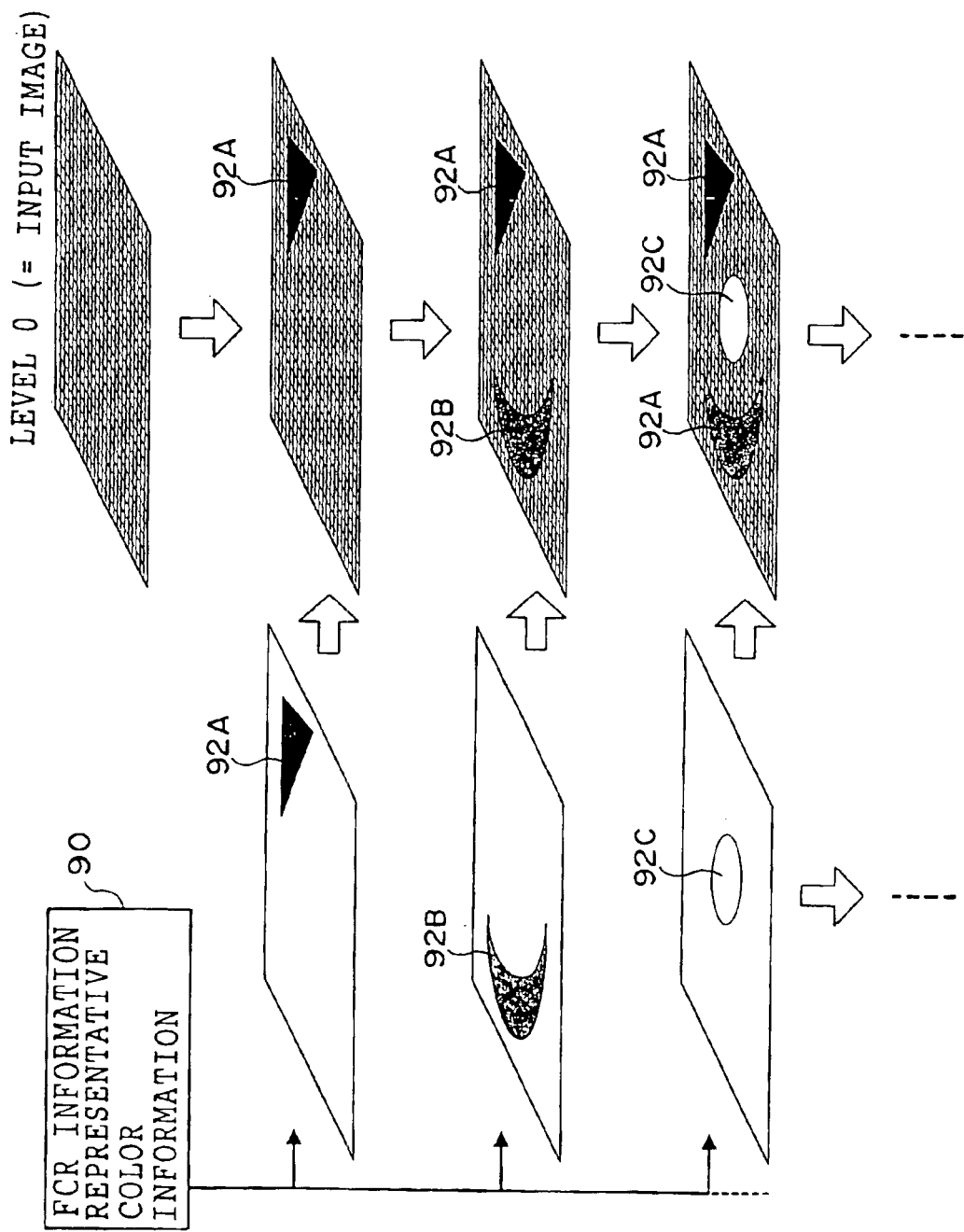

F I G. 2 6
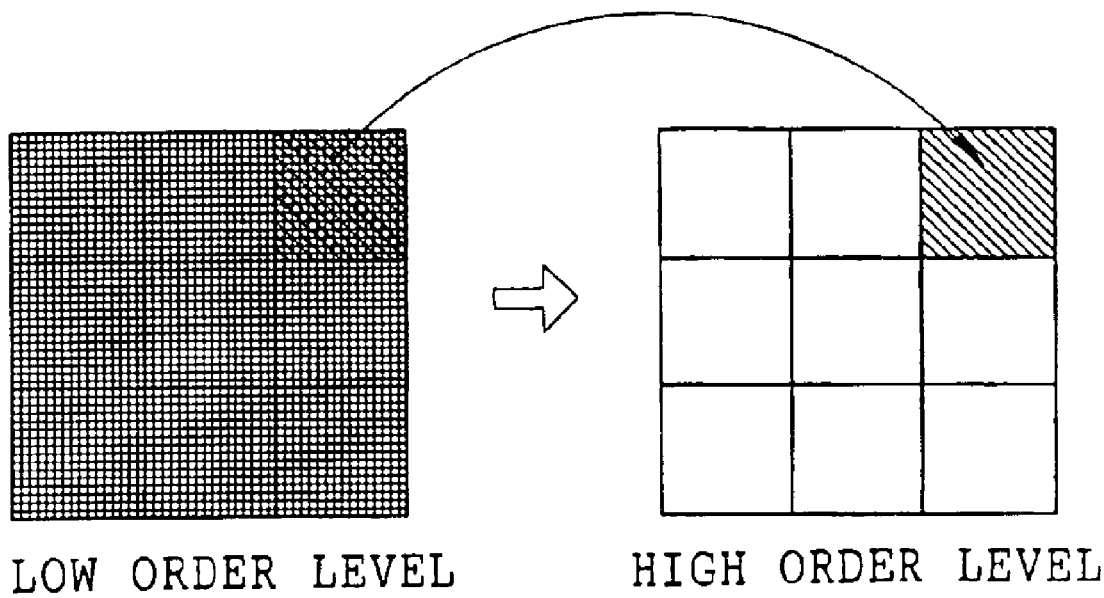

F I G. 28 A
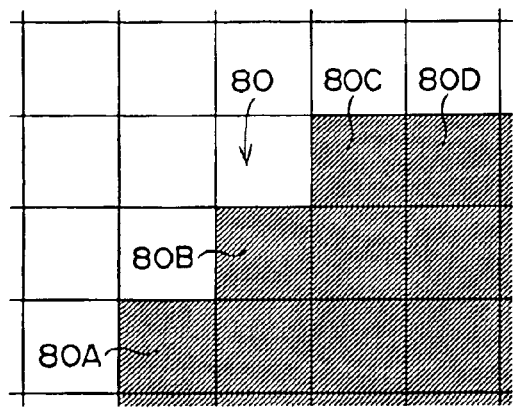
F I G. 28 B
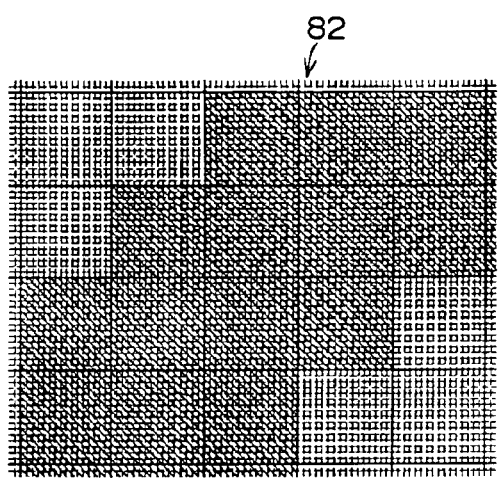
F I G. 28 C
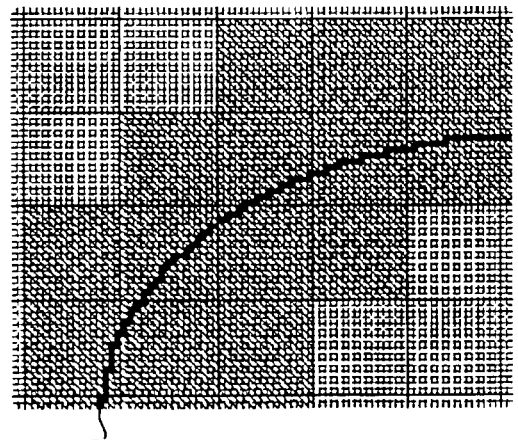
F I G. 28 D
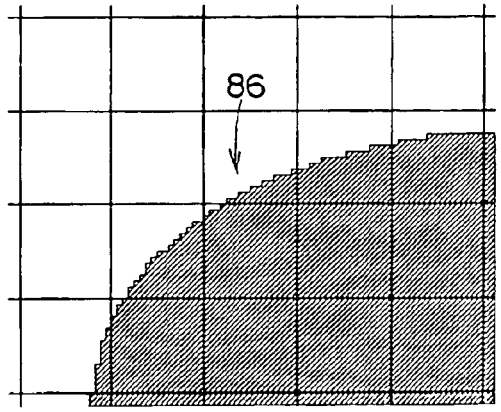

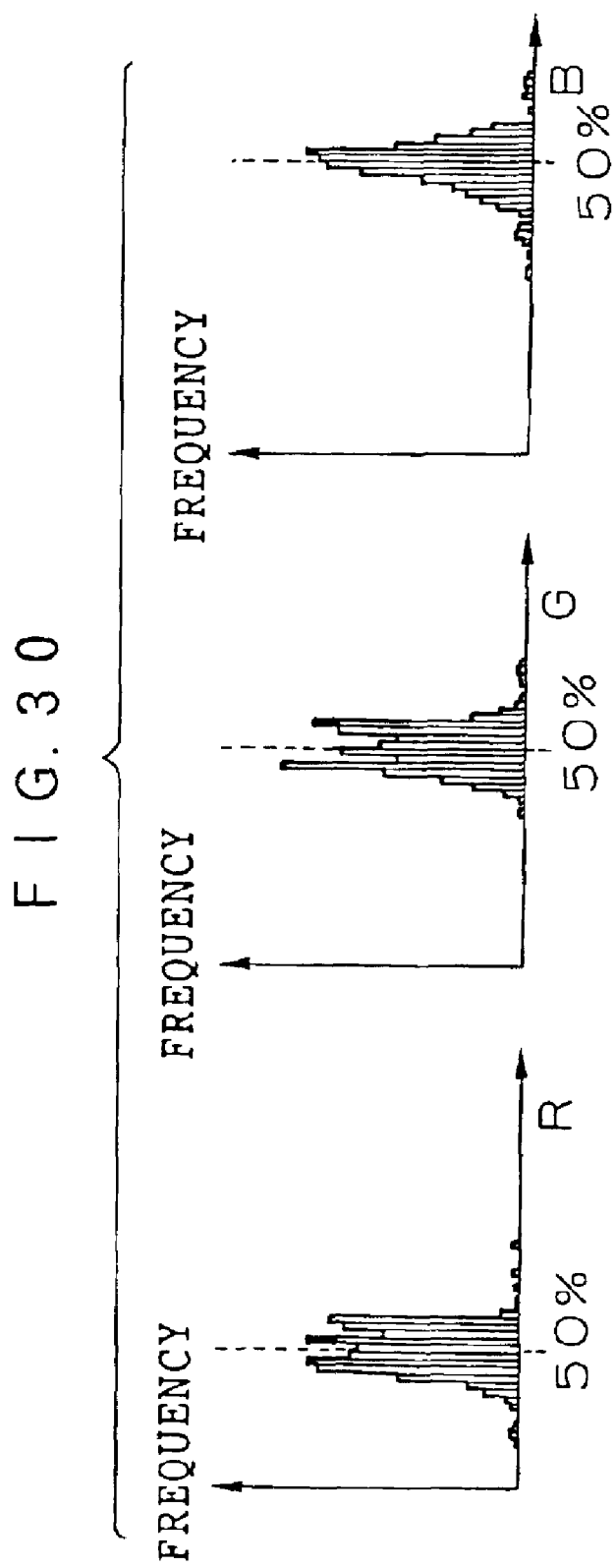
F I G. 30

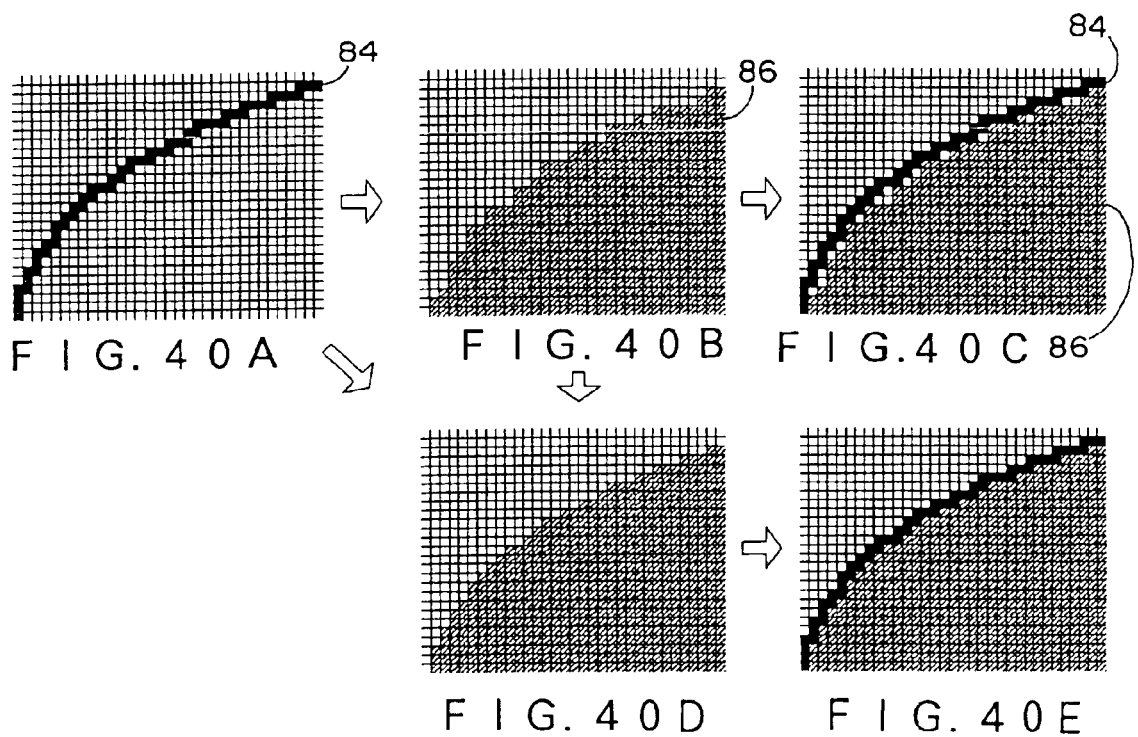

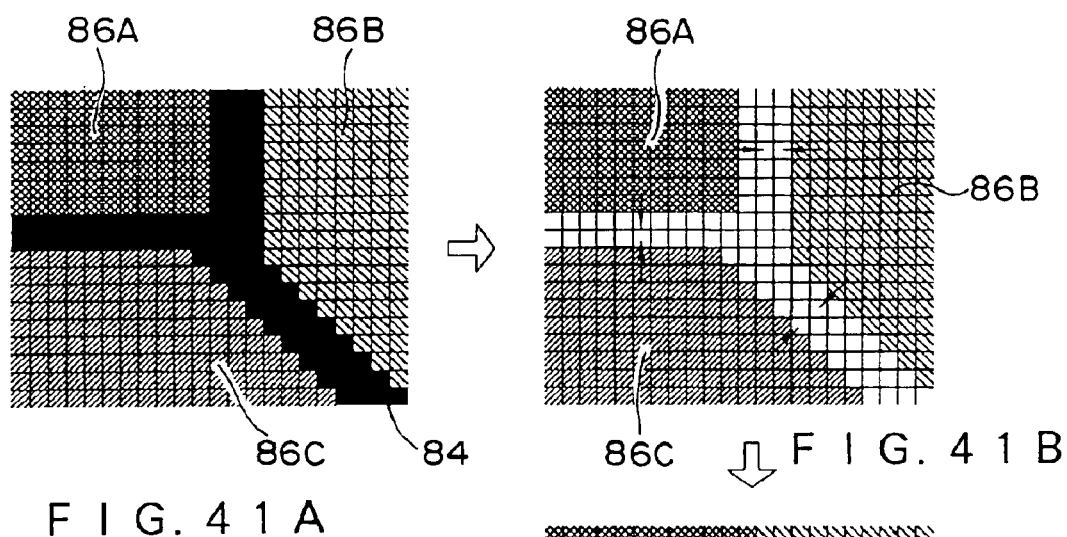
FIG. 41A
FIG. 41B
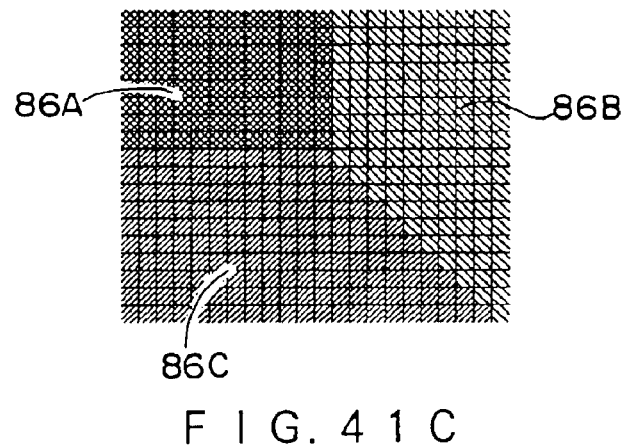
FIG. 41C

IMAGE PROCESSING DEVICE AND
RECORDING MEDIUM

BACKGROUND OF THE INVENTION

1. Field of the Invention

The present invention relates to an image processing device and a recording medium, and in particular, to an image processing device and a recording medium which enable processing for improving image quality in a digital color image processing, such as reading or copying of a color document, or the like.

2. Description of the Related Art

In recent years, digital color devices have been remarkably developed and spread in the fields of scanners, copying machines, printers, and the like. Further, a document composing environment such as personal computers, word processor softwares, or the like has also advanced and developed. Accordingly, in the field of color image reproduction which uses the above-described digital color devices, not only a natural image of a person, landscape, or the like, but also a document image which is mainly formed by character information, a graph, a diagram, or the like has become an important object of processing.

When the document image is compared to the natural image, characteristically, the document image is expressed by extremely small number of colors, such as from two or three colors to about dozens of colors at most, and a great number of regions having a large surface area and the same color exists in the document image, or the like. As a result, caused by the quality of an original document, by the device characteristics of an image reading device, and by excessive emphasis or the like in an image processing such as gradation correction, MTF correction, or the like, there is a problem in that noise or uneven color is generated in the color region which should be originally the same at the time of image reproduction.

In order to solve the problem, various methods of enhancing the uniformity of a color by using a so-called subtractive color processing technique which reduces the number of colors in an original image have been proposed. For example, Japanese Patent Application Laid-Open (JP-A) No. 8-22532 discloses a technique of reducing unevenness in a document image by limiting a component ratio of colors existing in an original image. Further, JP-A-10-243250 discloses a technique of improving the reproduction of uniform color regions by means of setting a color region which should be reproduced flat and a color region which is not in accordance with a color distribution in an original image and then effecting color correction.

SUMMARY OF THE INVENTION

However, the above-described conventional art is either a processing for replacing a color with the closest color in the unit of each pixel or a processing of changing a correction coefficient therein. Thus, the processings are likely to be affected by a dot component or minute noise existing in the original image. As a result, there is a case in which reduction in the number of colors does not necessarily lead to uniform color enhancement in the desired region. Further, setting of a representative color which is effected in advance of the color replacement also requires complicated arithmetic processing and, on the whole, there is a drawback in that appropriate processing quality cannot be obtained with respect to the processing scale.

The present invention was developed in light of the aforementioned, and the object thereof is to provide an image processing apparatus and a recording medium which can improve the quality of a color document image.

In order to achieve the above-described object, a first aspect of the present invention is an image processing apparatus, comprising: image generating means which generates, from an input image which has been read at a resolution determined in advance by an image reading means which scan-reads an image, at least one converted image having a resolution which is lower than the resolution of the input image; candidate region setting means which determines at least one region having substantially uniform color as a candidate color region from the converted image having low resolution; and processing means which, on the basis of the candidate color region and an image having a resolution which is higher than the resolution of the converted image having low resolution, generates an intermediate image which includes at least one region which has substantially uniform color as a uniform color region and has substantially the same resolution as the input image, and the processing means processes the input image on the basis of the generated intermediate image.

In accordance with the present invention, from the input image which has been read at a resolution determined in advance by the image reading means which scan-reads an image, e.g., a scanner, the image generating means generates at least the one converted image having a resolution which is lower than the resolution of the input image.

In order to convert the input image into the converted image having a resolution which is lower than the resolution of the input image, for example, the input image is divided into regions which includes a plurality of pixels, and a mean value of the pixels within each region is calculated. The calculated mean value of the pixels is a pixel value of the region. The converted image having low resolution to be generated may be one or plural.

It should be noted that when an image such as, for example, a document image or the like, which has a comparatively large surface area and has a great number of same color regions is scan-read, uneven color may be generated in the same color region and the image quality may be deteriorated. As a result, it is necessary to simulate a read image based on the original image by extracting the same color region and making the color of the region substantially uniform.

Accordingly, from the converted image which has been generated by the image generating means and has a resolution which is lower than the resolution of the input image, the candidate region setting means determines at least the one region having substantially uniform color as the candidate color region. The candidate color region is determined from the converted image having low resolution because, in the image having low resolution, it is easy to detect a character element or a pattern element included in the image and the same color region. Therefore, the resolution of the converted image is set to a resolution at which it is easy to detect the character element or the pattern element included in the image and the same color region.

The processing means sets the region which has substantially the uniform color as being the uniform color region on the basis of the candidate color region, which has been set by the candidate color setting means, and the image having a resolution which is higher than the resolution of the converted image having low resolution, which has been generated by the image generating means. Namely, since a boundary of the candidate color region, which has been set from the converted image having low resolution, may be outside the same color region in the original image, pixels in a region in the image having resolution which is higher than the converted image having low resolution, e.g., the input image, which corresponds to the candidate color region or pixels in a region which is adjacent to the candidate color region are used as a reference. Then, a boundary which exists in the candidate color region or the adjacent region is detected, the interior of the boundary is set as a uniform color region which is substantially the uniform color region, and the color of pixels within the uniform color region is, for example, set to the same color.

Further, the processing means generates an intermediate image which includes at least the one set uniform color region and which has substantially the same resolution as that of the input image e.g., which has the same resolution as that of the input image. The intermediate image may be generated, for example, at every uniform color region, or may be generated as one image which includes all of the uniform color regions. Moreover, the intermediate image may be formed by raster data or may be formed by coordinate data at the boundary portion in the uniform color region.

Then, the processing means processes the input image on the basis of the generated intermediate image. For example, the generated intermediate image is overwritten (synthesized) on the input image. In this way, even if the image, such as a document image or the like, which has a comparatively large surface area and has a great number of same color regions is scan-read, the quality of the read image can improve.

Further, the image generating means may generate the one converted image having low resolution and use the image having high resolution as the input image. Namely, the above processings are effected using only the two images, i.e., the input image and the converted image having low resolution. In this way, the processings can be simplified.

Moreover, the candidate region setting means may measure a color distribution of the converted image having low resolution, may include subtractive color image generating means which generates a subtractive color image on the basis of the measured color distribution, and may determine at least one region having substantially the uniform color as a candidate color region on the basis of the generated subtractive color image. Namely, the pixels of the color which has a small number of pixels are detected from the measured color distribution, and the subtractive color image which has excluded the pixels is generated. Then, the region having substantially the uniform color is determined as the candidate color region on the basis of the generated subtractive color image. In this way, the uniform color region can be determined accurately.

Further, the candidate region setting means may redetermine the candidate color region on the basis of at least one of the size, the configuration, and the aspect ratio of the candidate color region. Namely, for example, when improvement of the image quality is not anticipated even if the uniformity of the image is enhanced by the same color, for example, when the size of the candidate color region is small, when the configuration thereof is complicated, or when the aspect ratio is large and the width thereof is narrow, the candidate color region is excluded. In this way, uniform color enhancement of an unnecessary region is prevented.

Further, the candidate region setting means may determine correlation between the color of the candidate color region and the color of a region in the image having high resolution which corresponds to the candidate color region and may redetermine a candidate color on the basis of the determined correlation. For example, a standard deviation between the color of the candidate color region and the color of the region in the image having high resolution which corresponds to the candidate color region is determined, and when the standard deviation is greater than a predetermined value, i.e., when the color differs from that of the actual image to a predetermined degree, the candidate color region is excluded. In this way, uniform color enhancement of an unnecessary region is prevented.

Moreover, the processing means can detect an edge of a region in the image having high resolution which corresponds to the candidate color region and can set the region which is surrounded by the detected edge as a uniform color region. For example, a technique, such as Sobel operation or the like, can be used for the edge detection. In this way, the uniform color region can be set accurately.

Further, the processing means may obtain a mean value of pixel values in the uniform color region and set the obtained mean value as a color of the uniform color region. The processing means may obtain a central value of the pixel values in the uniform color region and set the obtained central value as the color of the uniform color region.

Moreover, the processing means may exclude pixels whose number of pixels in the uniform color region is smaller than a predetermined number and may obtain the color of the uniform color region. In this way, influence caused by noise or the like can be prevented.

Further, the processing means may replace the color of the uniform color region with a predetermined pure color which has been determined in advance. For example, when the color is similar to a pure color which has been determined in advance, such as white, black, blue, red, green yellow, or the like, the color is replaced with the pure color. In this way, a vivid image can be obtained.

Moreover, segment element extracting means, which extracts a segment element from the input image, and difference image generating means, which generates a difference image which has excluded the segment element from the input image, are further included. The image generating means can generate, from the difference image, at least one converted image having resolution which is lower than the resolution of the difference image, and the processing means can process the input image on the basis of the extracted segment element and the intermediate image.

Namely, when the segment element such as a character or the like exists in the image, the converted image having low resolution is generated from the difference image which has excluded the segment element. Then, the candidate region setting means determines at least one region having substantially the uniform color as a candidate color region from the converted image having low resolution. On the basis of the candidate color region and an image having resolution which is higher than the resolution of the converted image having low resolution, an intermediate image, which includes at least one region which has substantially uniform color as a uniform color region and has substantially the same resolution as the input image, is generated. The input image is processed on the basis of the extracted segment element and the intermediate image. In this way, the uniform color region can be set accurately even in the image including the segment element such as a character or the like, and improvement of the image quality can be achieved.

Further, the difference image generating means may replace pixels in the region of the excluded segment element in the difference image with peripheral pixels of the segment element. For example, when the peripheral regions of the segment element have one color, the pixels in the region of the segment element may be replaced with the pixels in the peripheral regions. Moreover, when the peripheral regions of the segment element have different colors, the pixels in the region of the segment element may be replaced with the pixels in the peripheral regions so as to expand the respective regions outwardly.

Further, eliminating means, which measures a color distribution of the segment element, generates a subtractive color image of the segment element on the basis of the measured color distribution, and eliminates pixels of an isolated color in the segment element on the basis of the generated subtractive color image, may be further included. In this way, dispersion of color in the segment element can be reduced.

Moreover, the segment element extracting means may extract the segment element having a specific color which has been determined in advance. For example, the processing can be simplified by extracting only the segment element of a color, such as black or the like, which is often used in the document image.

A computer readable recording medium on which a program for executing processings is recorded, the program comprising the steps of: generating, from an input image which has been read at a resolution determined in advance, at least one converted image having a resolution which is lower than the resolution of the input image; determining at least one region having substantially uniform color as a candidate color region from the converted image having low resolution; and on the basis of the candidate color region and an image having a resolution which is higher than the resolution of the converted image, generating an intermediate image which includes at least one region having substantially uniform color as a uniform color region and which has substantially the same resolution as the input image, and processing the input image on the basis of the generated intermediate image. By the recording medium, the above-described processings can be executed on a computer.

A second aspect of the present invention is a computer readable recording medium on which a program for executing processings is recorded, the program comprising the steps of: generating, from an input image which has been scan-read at a resolution determined in advance, at least one converted image having a resolution which is lower than the resolution of the input image; determining at least one region having substantially uniform color as a candidate color region from the converted image having low resolution; and on the basis of the candidate color region and an image having a resolution which is higher than the resolution of the converted image having low resolution, generating an intermediate image which includes at least one region having substantially uniform color as a uniform color region and which has substantially the same resolution as the input image, and processing the input image on the basis of the generated intermediate image.

Further, the other respective processings can be also performed on the computer by the computer readable recording medium, onto which the program for executing the processings is recorded.

BRIEF DESCRIPTION OF THE DRAWINGS

FIG. 1 is a schematic structural view of an image processing apparatus relating to the present invention.

FIG. 2 is a view for explaining about resolution conversion.

FIG. 5 is a view for explaining about a relationship between attributes set in the characteristic detection processing and the resolution.

FIG. 7 is a flowchart which shows the detailed flow of the image processing.

FIG. 8 is a view for explaining about concrete resolution conversion.

FIG. 10 is a flowchart which shows the flow of a subtractive color processing.

FIG. 11 is a view for explaining about the division of a three-dimensional color space.

FIGS. 13A through 13C are views which show the data structure of a subtractive color image.

FIG. 14 is a flowchart which shows the flow of a region candidate extraction processing.

FIGS. 17A through 17D are views for explaining about an FCR boundary detection processing.

FIG. 18 is a view for explaining about an edge detection processing.

FIG. 19 is a view for explaining about a representative color selection processing of the FCR.

FIG. 20 is a view which shows an example of results of measurement of color distribution.

FIG. 21 is a view for explaining about a contrast emphasizing processing.

FIG. 22 is a view for explaining about regeneration of an image.

FIG. 26 is a view for explaining about resolution conversion.

FIGS. 28A through 28D are views for explaining about an edge detection processing.

FIG. 30 is a view which shows an example of results of measurement of color distribution.

FIGS. 40A through 40E are views for explaining about correction of boundary of an FCR 86.

FIGS. 41A through 41C are views for explaining about the generation of a difference image.

DESCRIPTION OF THE PREFERRED EMBODIMENTS

First Embodiment

Figure 3:
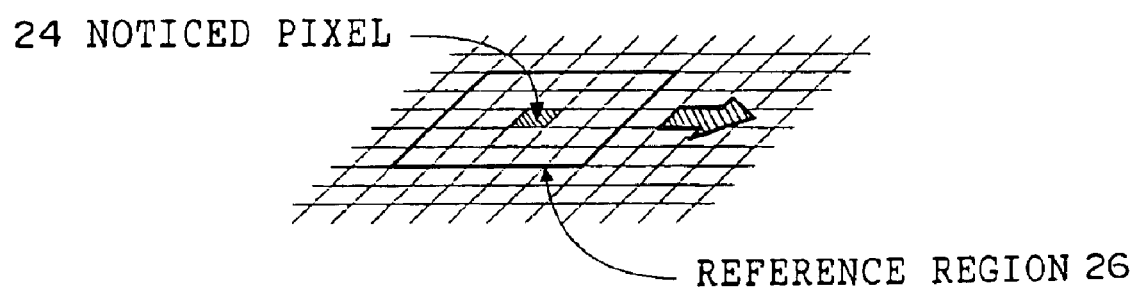
FIG. 3 is a view for explaining about a characteristic detection processing.

A first embodiment of the present invention will be described hereinafter with reference to the drawings. FIG. 1 shows a schematic block diagram of an image processing apparatus 10 relating to the present invention.

As illustrated in FIG. 1, the image processing apparatus 10 includes an image input means 12, an image processing means 14, an image storing means 16, an image display means 18, an image output means 20, and a communication means 22.

The image input means 12 is a means for inputting an image and is a color image input device, for example, such as a flat-bed scanner or the like. The image processing means 14 is a means for performing an image processing for improving the quality of an image which has been input from the image input means 12. The image storing means 16 accumulates/stores a color original image which has been input from the image input means 12, a color image which has been subjected to correction processing by the image processing means 14, or the like. The image display means 18 is a means for displaying the color image which has been subjected to correction processing by the image processing means 14. The image output means 20 is a means for printing the color image which has been subjected to correction processing by the image processing means 14. The communication means 22 is a means for sending the color image which has been subjected to correction processing by the image processing means 14, for example, to the other device.

The image input means 12 corresponds to an image reading means of the present invention, and the image processing means 14 corresponds to an image generating means, a candidate region setting means, and a processing means of the present invention.

In the image processing apparatus 10, a document image, which is to be the object of processing and has been recorded, for example, onto a paper, is read by the image input means 12. The input means 12 outputs the read image to the image processing means 14 as a full color image having, for example, eight bits of R, G, and B per one pixel.

The image processing means 14 carries out a processing in which a region which has a comparatively large surface area and is expressed by substantially the same color (hereinafter, the region will be referred to only as "FCR (Flat Color Region)") is detected, uniformity of the FCR is enhanced by an appropriate color, and the FCR is regenerated.

The color image, which has been subjected to correction processing by the image processing means 14, is accumulated/stored in the image storing means 16, or is displayed by the image display means 18, or is print-output from the image output means 20, or is sent to the other digital color processing device via the communication means 22.

Next, the details of image processing in the image processing means 14 will be described.

First, a basic idea of the present invention will be described. In the present embodiment, the image processing is carried out using an image shown in FIG. 2 which is expressed by a plurality of levels of resolutions. As illustrated in FIG. 2, conversion of the image into a plurality of levels of data structures is effected by repeating a processing which contracts an input image by, for example, 50%.

Namely, assuming that the resolution of the input image (original image) is level 0, the input image is subjected to ½ (50%) contraction processing such that an image whose resolution is level 1 is generated. Further, the image of level 1 is subjected to ½ contraction processing such that an image whose resolution is level 2 is generated. Thereafter, an image of level 3 and an image of level 4 are generated in the same manner. Consequently, the higher the level, the lower the resolution, and conversely, the lower the level, the higher the resolution.

Next, the concept of a region detection processing which is carried out using the data structures will be described. Namely, description will be given of how components of the document image, such as "character", "pattern", and "FCR" which is the object of correction in the image processing of the present invention, are detected characteristically in the images having different levels, i.e., images having different resolutions.

As illustrated in FIG. 3, description will be given of a basic idea of the present invention, i.e., a region which centers around a noticed pixel 24 and has 5 by 5 pixels is referred to as a reference region 26, and a characteristic detection processing which determines the spatial characteristic and the gradational characteristic in the unit of pixel is used as an example.

The determination of the spatial characteristic is effected by determining the noticed pixel 24 as one of three attributes, i.e., a "dot element" which includes an isolated point, a discrete dot, or the like; an "edge element" which includes a character, a line, and a boundary of the region, and a "flat portion" which does not have a steep change. Further, the determination of the gradational characteristic is carried out by counting the number of colors which exist in the vicinity of the noticed pixel 24 and determining the number of colors as "small", "medium", or "large".

Figure 4:
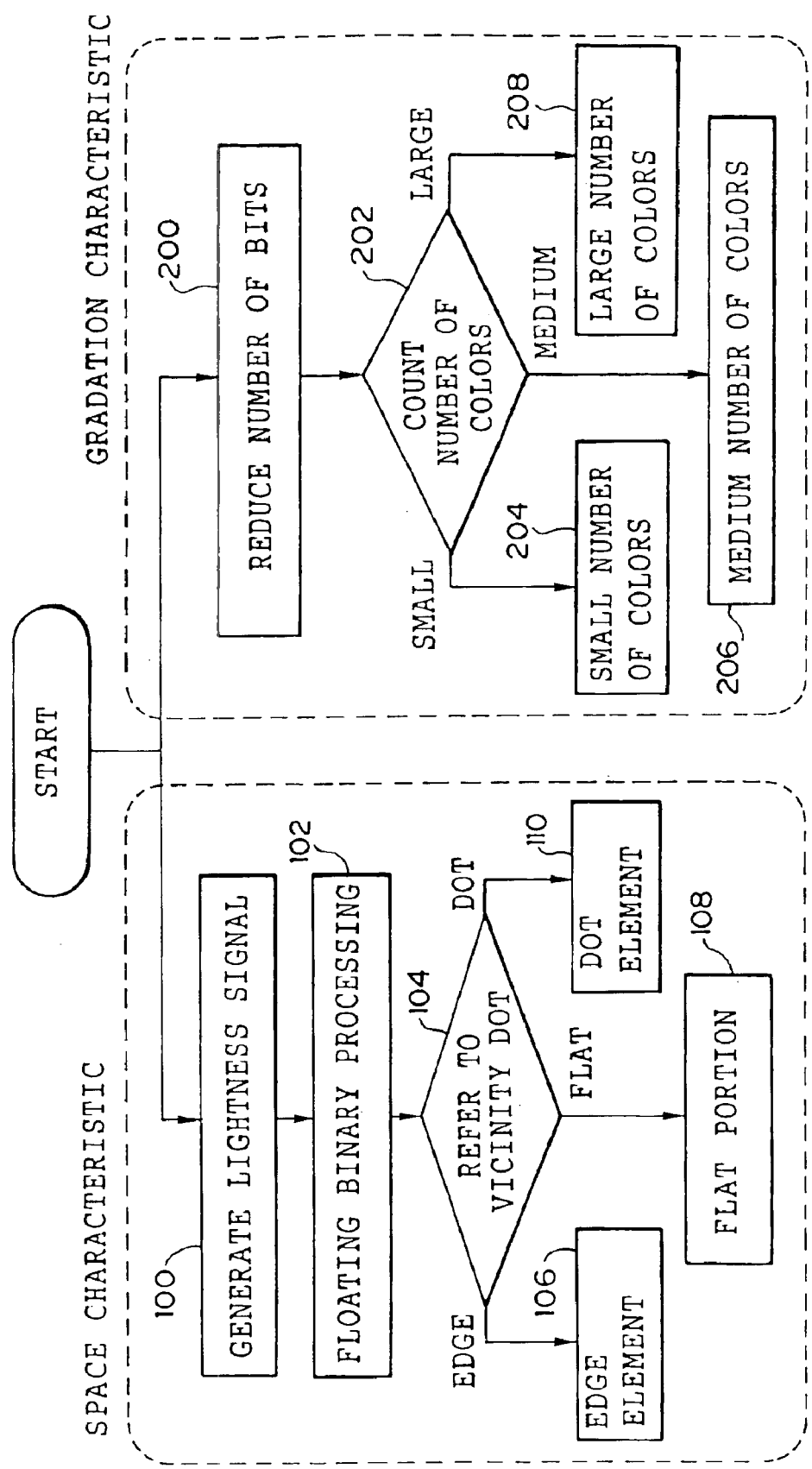
FIG. 4 is a flowchart which shows the flow of the characteristic detection processing.

FIG. 4 shows a flowchart of the characteristic detection processing which is performed in the image processing means 14. As shown in FIG. 4, detection of the amount of spatial characteristics is carried out using a lightness signal which represents contrast information of a color image. First, a lightness signal (lightness value) is generated in accordance with the following operation using respective image signals of R, G, and B which have been input from the image input means 12 (step 100).

Lightness signal=$0.3 \times R + 0.6 \times G + 0.1 \times B$

Next, lightness mean value of, for example, 5 by 5 pixels which center around the noticed pixel is calculated and is compared to the lightness value of the noticed pixel. Then, if the lightness value of the noticed pixel is large (the pixel is dark), the pixel is referred to as an ON pixel. If the lightness value of the noticed pixel is small (the pixel is bright), the pixel is referred to as an OFF pixel. A binary image is generated by effecting this processing to each pixel (step 102).

Regarding the binary image which has been generated in the above-described processing, the number and the connecting state of the ON pixels within the 5 by 5 vicinity pixels which center around the noticed pixel are determined (step 104), and one of the attributes "edge element", "dot element", and "flat portion" is set to the noticed pixel (steps 106, 108, and 110). For example, if the adjacent pixels are ON pixels and the ON pixels are connected, it can be determined that the noticed pixel is an edge element. If the number of ON pixels is less than a predetermined number, it can be determined that the noticed pixel is a dot element. If the number of OFF pixels is more than the predetermined number, it can be determined that the noticed pixel is a flat portion.

As mentioned before, detection of the amount of gradational characteristics is carried out by counting the number of colors within the reference region 26. By considering a noise component included in the processed image, among the gradational components having eight bits of R, G, and B, the low order 3 bits are deleted and only the high order 5 bits are used (step 200).

Next, the number of colors which exist in the reference region 26, which centers around the noticed pixel 24 and has 5 by 5 pixels, is counted and compared to a predetermined threshold value (step 202). Then, in accordance with the number of colors, for example, any one of three-stage attributes, i.e., "small number of colors", "medium number of colors", and "large number of colors" is set to the pixel (steps 204, 206, and 208).

FIG. 5 shows how the attribute which is set to each pixel in the above processings changes in accordance with the components of document image, such as "character", "pattern", "FCR", or the like, and the levels (resolutions) of the above data structures.

As shown in FIG. 5, for example, in case of the "character" element, the number of colors does not change due to the difference in levels. However, as the level rises from a low order (resolution is high) to a high order (resolution is low), the spatial attribute becomes "edge element", "dot element", and "flat portion" in that order. In case of the "pattern" element, when the level is low, due to the influence of dots, the gradational attribute is determined as "medium number of colors" and the spatial attribute is determined as "dot element". However, when the level is high so that the dots are not detected, the number of colors increases and the edge elements start to be detected. Thus, the gradational attribute is determined as "large number of colors" and the spatial attribute is determined as "edge element".

Further, in case of "FCR" element, in the low level, because of the dots, the gradational attribute is determined as "medium number of colors" and the spatial attribute is determined as "dot element" in the same way as in the "pattern" element. At the level in which there is no influence of dots, the gradational attribute is determined as "small number of colors" and the spatial attribute is determined as "flat portion". When the level further goes up and the reference region includes a region boundary portion of the FCR, the gradational attribute is determined as "medium number of colors" and the spatial attribute is determined as "edge element". Needless to say, these spatial and gradational attributes depend on the resolution of the input document image, the size, layout/design of each element of "character", "pattern", and "FCR", or the like. However, the characteristics which are obtained from the respective document forming elements are considered roughly the same.

For example, if the detection processing of FCR is effected on an image having high resolution, since the "pattern" element and the "FCR" element have extremely similar characteristics spatially and gradationally, it is difficult to achieve the detection processing precisely. However, if the level is raised so that there is no influence of dots, there is a large difference between the spatial and gradational characteristics of the "pattern" element and the "FCR". As compared to the processing at the high resolution, it is easy to separate the two elements.

Similarly, regarding identification of the "character" element and the "FCR" element as well, it is preferable to carry out the region detection processing using a higher level image, in which some of the elements become "flat portion", than to identify the "edge element" of the "pattern" element and the "dot element" of the "FCR" element in an image having high resolution.

The present invention is based on such viewpoint, and the region detection processing is effected using image data structures having a plurality of levels of resolutions. In this way, the image quality can be improved efficiently.

Next, the flow of image processing which is performed in the image processing means 14 will be explained with reference to FIGS. 6 and 7.

Figure 6:
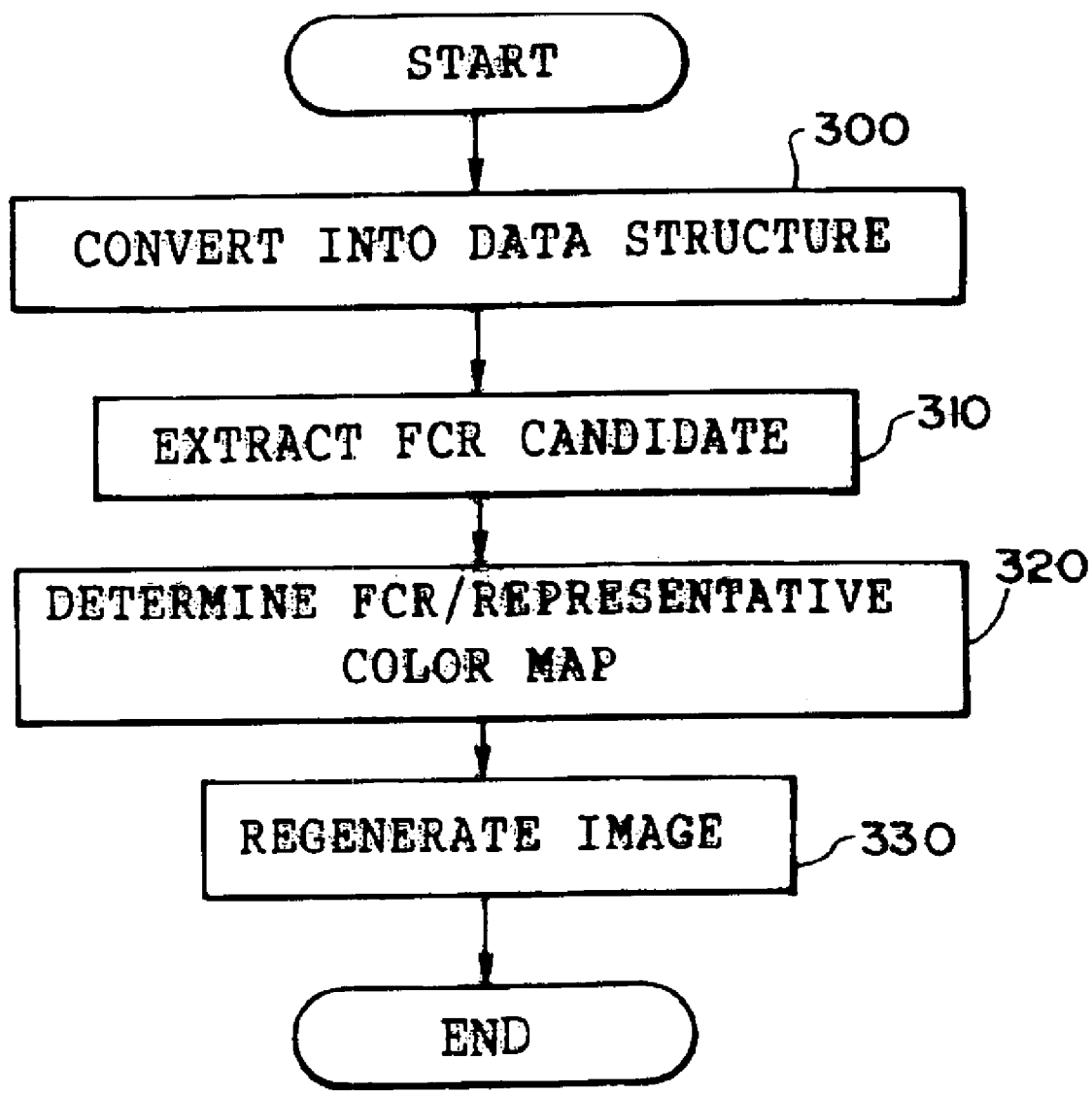
FIG. 6 is a flowchart which shows the flow of an image processing.

FIG. 6 shows a schematic flow of processing of the image processing and FIG. 7 shows the detailed flow of the image processing.

As illustrated in FIG. 6, first, an input color image is converted into an internal data structure, which is suitable for the image processing and has a plurality of levels of resolutions, in accordance with the aforementioned method (step 300). Next, a candidate region of the FCR is extracted using a predetermined level of image in the internal data structure (step 310). Next, the FCR is redetermined using an image data whose level is different from the predetermined level which was used in the extraction of the FCR candidate region. The ultimate FCR is generated and a representative color which regenerates each FCR is determined (step 320). Finally, a predetermined region in the document image is replaced with the predetermined same color on the basis of the information of the obtained FCR and the representative color to be replaced. The present processing thereby ends (step 330).

Next, the detailed contents of the image processing will be explained with reference to FIG. 7.

As illustrated in FIG. 7, the image which has been input from the image input means 12 is subjected to contraction processing having a predetermined magnification (e.g., ½), and a converted image having low resolution is generated (step 301). A determination is made as to whether the resolution conversion is effected a predetermined number of times which was determined in advance (step 302), and the resolution conversion is repeated up to the predetermined number of times. For example, when the internal data structure having a level of N layers (N is a positive number) is desired, the predetermined number of times is (N−1). Namely, for example, as shown in FIG. 2, when the data structure having four layers of level 0 to level 3 is desired, the resolution conversion is carried out three times. Further, the generated image data of respective levels is temporarily stored in the image storing means 16 as an internal data structure 30.

FIG. 8 shows a concrete example of the resolution conversion which is executed in step 301. In FIG. 8, A to I denote a pixel value of each pixel. In order to contract an image having a predetermined level K shown in FIG. 8A by, for example, 50% and generate an image having one higher level (K+1) shown in FIG. 8B, as shown in FIG. 8A, the sum of four pixels which are formed by two by two pixels makes one block 40, and the mean value of the pixel values within the block 40, i.e., E (A+B+C+D)/4, is obtained. The obtained mean value E is a pixel value of one pixel of the (K+1) image. By carrying out the operation to all of the level K images, the level (K+1) images in which the level K images are contracted by 50% are generated.

Similarly, in order to contract the level (K+1) image shown in FIG. 8B by, for example, 50% and generate an image having one higher order level (K+2) shown in FIG. 8C, as shown in FIG. 8B, the sum of four pixels which are formed by two by two pixels makes one block 42, and the mean value of the pixel values within the block 42, i.e., I=(E+F+G+H)/4, is obtained. The obtained mean value 0 is a pixel value of one pixel of the (K+2) image. By carrying out the operation to all of the level (K+1) images, the level (K+2) images in which the level (K+2) images are contracted by 50% are generated.

Figure 9:
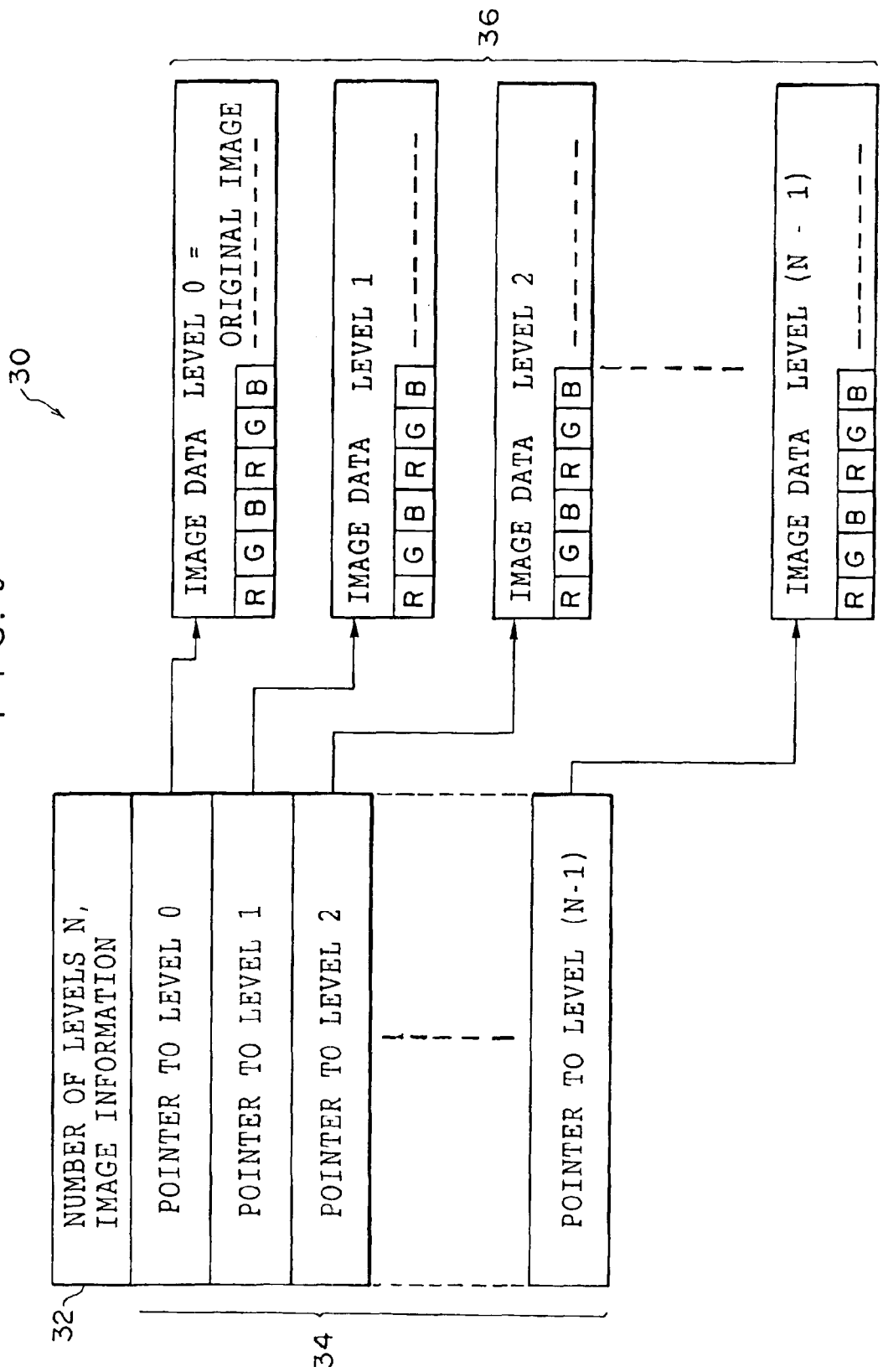
FIG. 9 is a view which shows the formation of an internal data structure.

FIG. 9 shows formation of the internal data structure 30 which is generated as a result of the resolution conversion effected in this way. The internal data structure 30 is formed by a header information 32 and a pointer information 34.

The header information 32 is formed by image information and the number of images which are generated in the resolution conversion, i.e., the number N of levels. The image information includes information such as width, height, of an input image, or the like.

The pointer information 34 is formed by pointers (addresses) having the number N of levels. The pointer is an address to an image data 36 of a corresponding level, and more specifically, a region in which each pixel value of R, G, and B is stored. By referring to the pointer, it is possible to know which address contains the image data 36 of a corresponding level.

As described above, when a predetermined number of resolution conversions is completed and the internal data structure 30 is generated, extraction of the FCR candidate (step 310) is executed.

The FCR candidate extraction processing is carried out onto an image having a predetermined level within the internal data structure 30. The image having a predetermined level is an image having a high order level in which minute image element influence, such as dots, edges, noise, or the like, is sufficiently small. For example, when an input image, i.e., a level 0 image, has a resolution of about 400 dpi (dot per inch), it is preferable that the predetermined level is about level 4. Hereinafter, the predetermined level is referred to as "level R" for the sake of convenience.

First, an image having level R is subjected to subtractive color processing (step 311). FIG. 10 shows a specific flow of processing of the subtractive color processing. The processing in step 311 corresponds to a subtractive color image generating means of the present invention.

As illustrated in FIG. 10, first, in order to prevent excessive influence of dots or noise on the level R color image, first, a processing for reducing the number of bits is carried out (step 400). For example, when a pixel data of one pixel is formed by a total of 24 bits (each R, G, and B has eight bits), low order three bits of each pixel data of R, G, and B are truncated, and the pixel data having high order five bits is formed. In this way, conversion of the original image data into image data having 32 ($=2^5$) gradations per color is carried out.

Next, frequency of appearance of the color image data having a total of 15 bits (each R, G, and B has 5 bits) per one pixel is measured three-dimensionally (step 402). Namely, the frequency of appearance in a three-dimensional color space which is defined by an R-axis, a G-axis, and a B-axis, which are orthogonal to each other, is measured.

Next, on the basis of three-dimensional color distribution data which has been obtained at the color distribution measurement, a color which forms the FCR, i.e., a color which has high frequency of appearance, is selected as a representative color. The selection of the representative color will be explained with reference to FIGS. 11 and 12.

Figure 12:
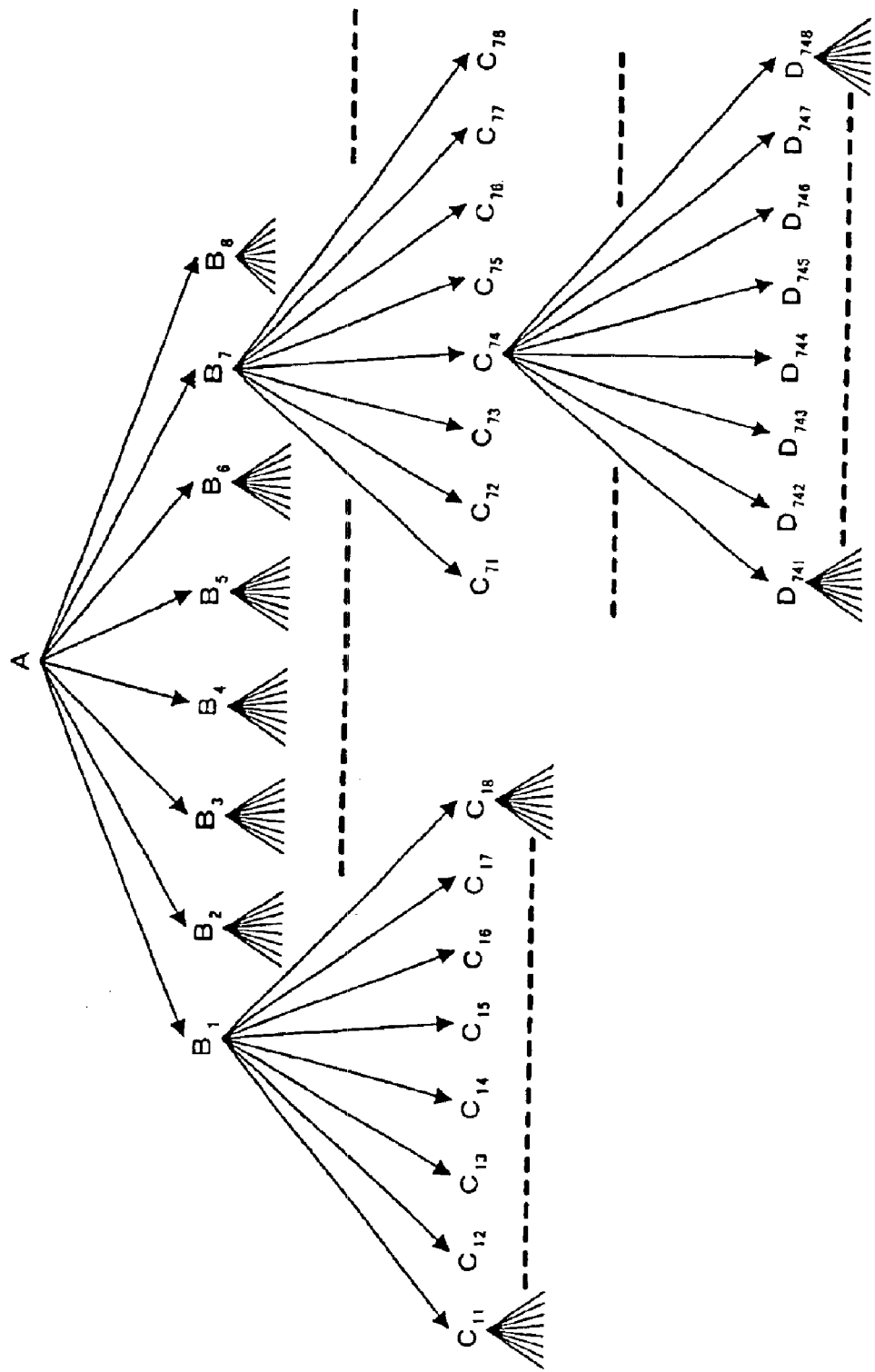
FIG. 12 is a view for explaining about the division of the three-dimensional color space.

As illustrated in FIG. 11, the representative color selection processing effected herein is carried out using a three-dimensional color space 50 (which is formed by the R-axis, the B-axis, and the G-axis which are orthogonal to each other) which is successively divided into eight equal spaces. When the three-dimensional color space 50 is successively divided in this way, as illustrated in FIG. 11, the three-dimensional color space 50 is divided into partial spaces $50_1$ to $50_{8i}$ and for example, the partial space $50_8$ is divided into partial spaces $50_{81}$ to $50_{88}$. FIG. 12 shows the division expressed in a tree form. As illustrated in FIG. 12, a three-dimensional color space A is divided into eight partial spaces B, to $B_8$, and for example, the partial space $B_7$ is divided into eight partial spaces $C_1$, to $C_{18}$, and a partial space $B_7$ is divided into eight partial spaces $C_{i1}$ to $C_{i8}$. Further, for example, a partial space $C_{74}$ is divided into eight partial spaces $D_{741}$ to $C_{748}$.

In the present embodiment, for example, the representative color is set using 4096 partial spaces which are obtained by effecting the division of space as shown in FIGS. 11 and 12 four times.

First, the pixel number of pixels which exist in a noticed partial space (which have a color of the partial space) is obtained using the results of measurement of color distribution which is carried out at precision of the sum of 15 bits (each R, G, and B has five bits), and then the pixel number is compared to a predetermined threshold value (step 404) which was set in advance. If the pixel number is greater than or equal to the threshold value, the partial space is temporarily stored in the image storing means 16 as a representative color space candidate, and the number n of representative color spaces is counted up (step 406).

On the other hand, if the pixel number of the noticed partial space is smaller than the predetermined threshold value, the pixel number of pixels which exist in the noticed partial space is unified with that of a parent partial space for the noticed partial space.

For example, in FIG. 12, when a partial space $C_{72}$ is a noticed partial space, if the pixel number of pixels which exist in the partial space $C_{72}$ is greater than or equal to the predetermined threshold value, the partial space $C_{72}$ is stored as a candidate for the representative color space. Further, when a partial space $C_{73}$ is a noticed partial space, if the pixel number of pixels which exist in the partial space $C_{73}$ is smaller than the predetermined threshold value, the pixel number of the partial space $C_{73}$ is unified with that of a partial space $B_7$ as the pixels in the partial space $C_{73}$ are those which belong to the partial space $B_7$. Namely, the pixel number of the partial space $C_{73}$ is added to the pixel number of the partial space $B_7$.

A determination is made as to whether the above-described determination processing is effected to all of the 4096 partial spaces (step 410), and the above-described processing is repeated until the processing is completed for all of the partial spaces. Then, a determination is made as to whether the number n of representative color spaces is greater than or equal to a predetermined threshold value (step 412).

If the number n of representative color spaces is greater than or equal to the predetermined threshold value, the processing for setting the representative color space ends. If the number n of representative color spaces is smaller than the predetermined threshold value, a determination is made as to whether the noticed partial space is a partial space of predetermined hierarchy which was set in advance (step 414). Then, if the noticed partial space is the partial space of predetermined hierarchy which was set in advance or higher, the processing for setting the representative color space ends. If the noticed partial space is lower than the partial space of predetermined hierarchy, the noticed space is moved to the parent space (hierarchy) which is one order higher (step 416) and the processing which is the same as the one described above is carried out.

Next, setting of the representative color is effected using information of the representative color space candidates which was obtained in the above processing. First, a mean color of pixels which belong to the representative color space candidates, i.e., the mean value of each pixel value of R, G, and B, is obtained for all of the representative color space candidates (step 418).

Next, for all of the obtained representative color candidates, a distance of mean value of each pixel R, G, and B in the three-dimensional space is calculated and compared to each other (step 420). Then, if there are representative color space candidates in which difference between the mean values falls within a predetermined range, the candidates are determined to be the similar colors. The mean value of the representative color space candidates which are determined to be the similar colors is further obtained, and the representative color space candidates are unified (step 422). In this way, the representative color in the subtractive processing is determined (step 424). For example, when the partial spaces $C_{11}$, and $C_{12}$ are included in the representative color space candidates, if the difference between the mean value of the partial space $C_{11}$ and the mean value of the partial space $C_{12}$ falls within the predetermined range, the mean value of the partial spaces $C_{11}$ and $C_{12}$ is obtained and the obtained mean value becomes a representative color candidate. Further, if there is no representative color space candidate in which the difference between the mean values falls within the predetermined range, the mean value of each representative color space which was obtained in step 418 becomes the representative color without any alternation thereto.

The subtractive color processing is effecting by comparing each pixel value of the input image (each R, G, and B has eight bits per one pixel) to all of the representative colors which have been determined in the aforementioned processing. First, a determination is made as to whether the difference between the pixel value of the noticed pixel and the representative color having the value which is closest to the pixel value falls within a predetermined range (step 426). If the difference falls within the predetermined range, the noticed pixel is determined to be the object of subtractive color processing and a closest representative color number is allocated to the noticed pixel as a pixel value (step 428).

On the other hand, if the difference between the pixel value of the noticed pixel and the representative color having the value which is closest to the pixel value is not within the predetermined range, it is determined that there is no appropriate representative color which should be allocated to the noticed pixel. Accordingly, FF (hexadecimal number), which indicates that the pixel is not the object of subtractive color processing, is allocated to the noticed pixel (step 430). Then, a determination is made as to whether the above-described processing is carried out to all of the pixels of the input image (step 432). The processing is repeated until the processing is carried out to all of the pixels.

Since the subtractive color processing is carried out, a subtractive color image 62 having a structure shown in FIGS. 13A through 13C. As illustrated in FIG. 13A, the subtractive color image 62 includes a data on the number of representative colors 64, a representative color table 66, and an image data 68. A number NN of representative colors (NN is a positive number) which is shown at the data on the number of representative colors 64 denotes the number of representative colors which were determined in the above processing. As shown in FIG. 13B, the representative color table 66 is a table which associates representative color number of the determined representative colors with representative color information corresponding to the representative color number, i.e., respective pixel values of R, G, and B. As shown in FIG. 13C, the image data 68 is an image data (denoted in hexadecimal number) which was subjected to the subtractive color processing. As described above, the pixel value of a pixel which is not subjected to the subtractive color processing is referred to as "FF".

After the subtractive color processing is carried out, a region candidate extraction processing is performed (step 312). In this processing, in the subtractive color image which has been generated in the aforementioned processing, adjacent pixels which are allocated to the same representative color are unified and an FCR candidate region is generated.

FIG. 14 shows the flow of the region candidate extraction processing. As illustrated in FIG. 14, in the present processing, an FCR candidate region is extracted for each representative color which was determined in the aforementioned subtractive color processing.

First, an adjacent pixel color is referred to the generated subtractive color image (step 500). If the color of the noticed pixel matches the noticed representative color, each pixel value of a three by three pixel region which centers around the noticed pixel is verified. If the color of the noticed pixel does not match the noticed representative color, the next pixel is referred until the color of the noticed pixel matches the noticed representative color. Then, a determination is made as to whether the noticed pixel is adjacent to the pixel of the same color (step 502). Then, if the noticed pixel is adjacent to the pixel of the same color, the pixels are unified (step 504).

If the noticed pixel is not adjacent to the pixel of the same color, or when the unification processing in step 504 ends, a processing for correcting an error in allocation processing in the subtractive color processing is carried out. Namely, in the three by three pixel region which centers around the noticed pixel, a determination is made as to whether all of the eight pixels other than the noticed pixel which has the same color as the noticed representative color have the same color, and the difference between the color of the noticed pixel and the color of the peripheral eight pixels falls within a predetermined range (step 506).

Then, if all of the eight pixels other than the noticed pixel have the same color, and the difference between the color of the noticed pixel and the color of the peripheral eight pixels is outside of the predetermined range (i.e., if the noticed pixel is like an isolated dot which is isolated from the peripheral pixels), it is determined that there is an error in allocation in the aforementioned subtractive color processing, such that the color of the noticed pixel is corrected to the color of the peripheral eight pixels (step 508). Namely, all of the colors of the three by three pixel region which centers around the noticed pixel are set to the same color.

Then, a determination is made as to whether the above-described processing is effected to all of the image data (step 510). If the processing is effected to all of the image data, a determination is made as to whether there is one or more region having the noticed representative color, i.e., there is a region in which the same color pixels are unified in step 504 (step 512). Then, if there is a region having the noticed representative color, the region information is stored/held in the image storing means 16 as an FCR candidate region data 74, which will be described later (step 514).

Then, a determination is made as to whether the above-described processing is completed for all of the representative colors (step 516). If the processing is not completed, the next representative color is set (step 518) and the processings which are the same as the above processings are performed.

Figure 15:
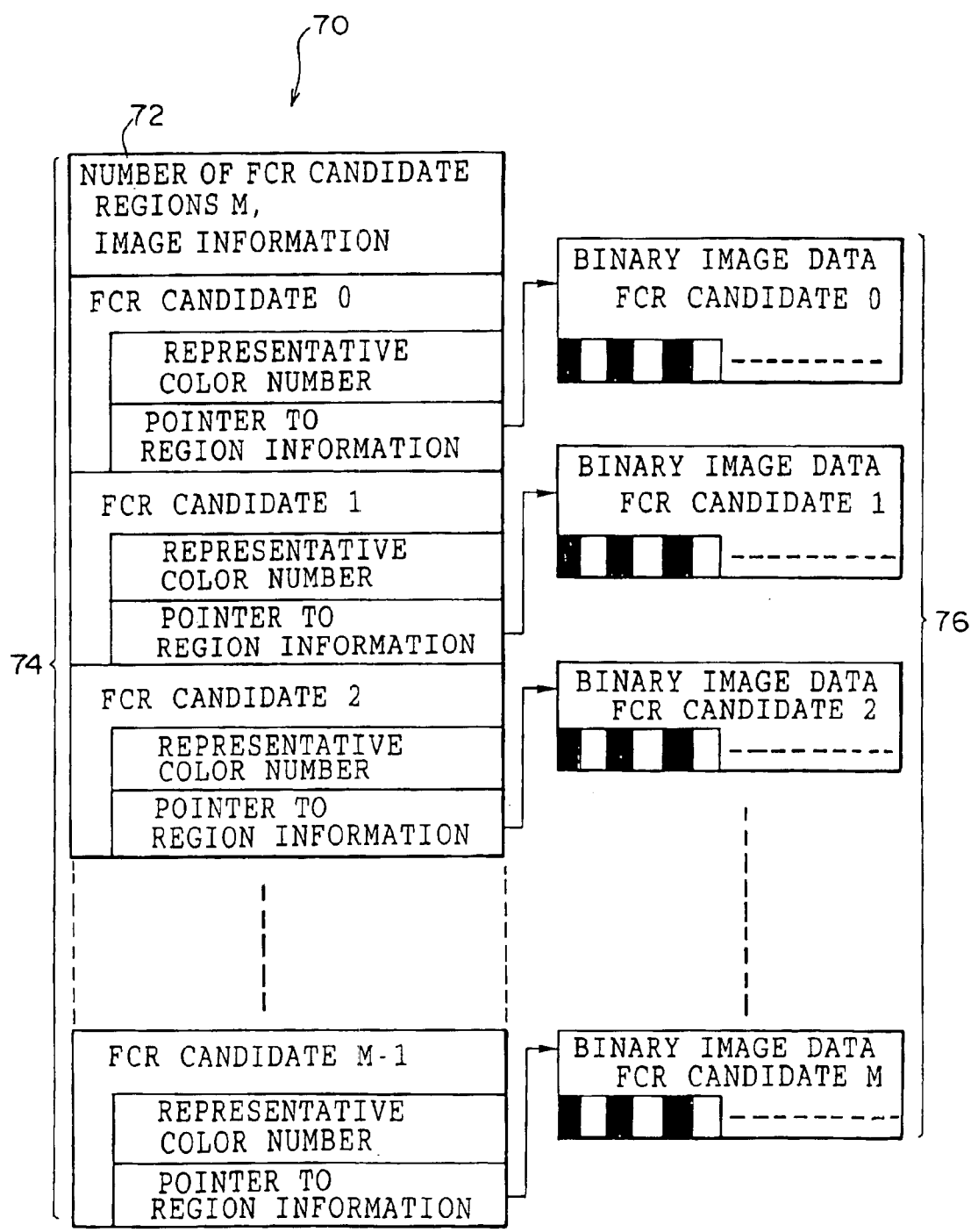
FIG. 15 is a view for explaining about the structure of FCR candidate information.

FIG. 15 shows the structure of an FCR candidate region information 70 which was generated in the above processing. The FCR candidate region information 70 is formed by a header information 72 and an FCR candidate region data 74 which serves as a candidate color region. The header information 72 includes a number M (M is a positive number) of FCR candidate regions and image size information, such as width, height, or the like, as the information on the entire image. The FCR candidate region data 74 is formed by M of representative color numbers and pointers to region information 76. As illustrated in FIG. 15, the region information 76 can be, for example, a binary image data in which a pixel of the representative color which is denoted by the representative color number is "1" and a pixel of the other color is "0". The region information 76 is not limited to the binary image data and may be a coordinate data of pixels at a contour portion of the FCR candidate region.

Figure 16:
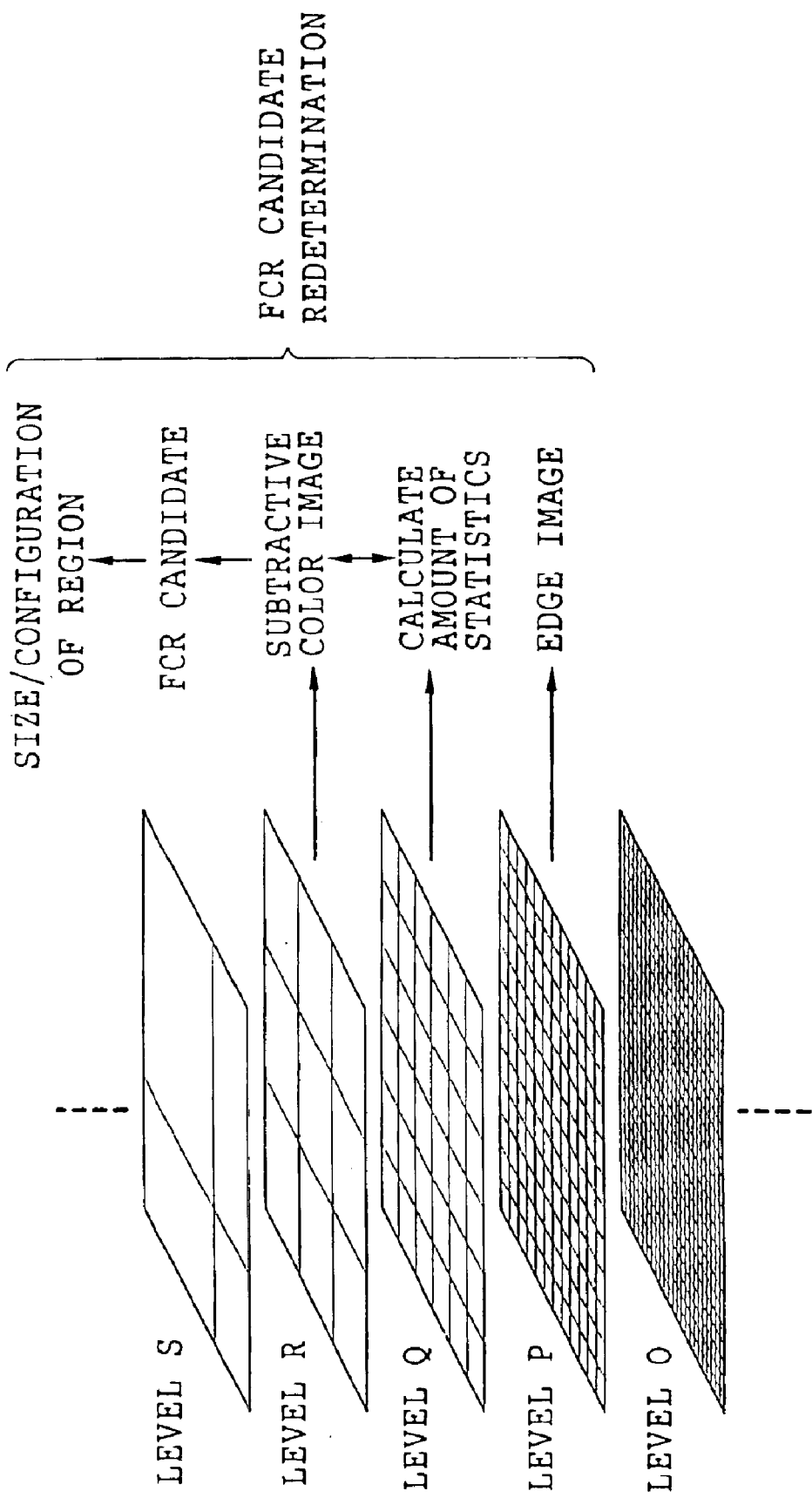
FIG. 16 is a view for explaining about a region redetermination processing.

Then, the FCR candidate region which was generated in this way is subjected to a region redetermination processing (step 313 in FIG. 7). As illustrated in FIG. 16, in the region redetermination processing, redetermination of the FCR candidate region is effected using an image having the level other than level R, more specifically, an image having the level which is lower than the level R (image having high resolution), e.g., the image of level P.

First, the point of redetermination includes the size and the configuration of the FCR candidate region. Because the FCR is ultimately a region which is regenerated in a uniform color, a small region or a narrow region is excluded from the FCR candidate. In such region, improvement of the image quality by enhancing the uniformity cannot be anticipated. First, the FCR candidate information 70 is referred. From the binary image data which is included in the region information 76, amounts of size characteristics of the region, such as a surface area of the noticed FCR candidate region, the contour of the region, the aspect ratio of the region, and the like, are obtained.

Next, the amounts of size characteristics of the region are respectively compared to predetermined threshold values which were set beforehand, and a determination is made as to whether the amounts satisfy the predetermined conditions. For example, a determination is made as to whether the size (the surface area) of the FCR candidate region is smaller than the predetermined threshold value. If the size is smaller than the predetermined threshold value, i.e., if the region is so small that the improvement of the image quality by enhancing the uniformity in the same color cannot be anticipated, the FCR candidate region is an object of exclusion. Further, a determination is made as to whether the aspect ratio of the FCR candidate region is greater than the predetermined threshold value. If the aspect ratio is greater than the predetermined threshold value, i.e., if the width of the FCR candidate region is so narrow that the improvement of the image quality by enhancing the uniformity in the same color cannot be anticipated, the FCR candidate region is an object of exclusion.

Next, a minute image component, which disappears in the image having level R which was subjected to subtractive color processing, is verified. The verification is mainly effected so as to avoid a drawback to a pattern region. Due to this processing, it is possible to avoid a drawback in which an edge portion, a texture structure, or the like which was not detected in the image having level R by chance is erroneously made uniform.

The verification of the minute image component is effected as follows. Namely, as mentioned above, in the image having a level which is lower than the level R, e.g., the image having level P shown in FIG. 16, a known edge detection processing which is represented by a Sobel operation is carried out, and the number of edge pixels in the noticed FCR candidate region is counted. If the number of edge pixels per unit of surface area is greater than a threshold value, it is determined that the FCR candidate region includes a pattern region. Thus, the FCR candidate region is the object of exclusion.

Finally, verification is made as to how suitable the representative color which was allocated to each FCR candidate region is to the color of a real image. The processing avoids a drawback in which a pixel group, which has pixel values which are originally completely different form the representative color, is averaged and thereby converges to the representative color. As illustrated in FIG. 16, a standard deviation value between the pixel value of the image having a level lower than the level R and the representative color of the FCR candidate region which was subjected to the subtractive color processing is calculated. If the calculated standard deviation value is a value indicating dispersion which is greater than a predetermined threshold value, it is determined that the region is an inappropriate region to be expressed by the representative color. Consequently, the FCR candidate region is the object of exclusion.

The processing is effected to all of the FCR candidate regions. After the end of the processing for redetermining the FCR candidate regions, the FCR candidate data 74, which is the object of exclusion, is omitted from the FCR candidate information 70 and the FCR candidate information 70 is updated.

Next, determination of the ultimate FCR and the representative color map is carried out (step 320 in FIGS. 6 and 7). The ultimate FCR is determined in an FCR boundary detection processing (step 321 in FIG. 7) for making the configuration of the region which was generated at the level R more precise and minute.

The FCR boundary detection processing is carried out as follows. For example, when a region denoted by a hatched portion in FIG. 17A is an FCR candidate region 80 in an image having level R, an image whose level is lower than the level R shown in FIG. 17B is referred and an edge element of the boundary portion of the FCR candidate region 80 is detected. As illustrated in FIGS. 17A and 17B, description will be given of a case in which edge detection is effected to an image whose level is lower than the image having level R by three levels, i.e., image whose one pixel having level R is divided into eight by eight and whose resolution is three times the resolution of the image having the level R.

First, a region of the edge portion of the FCR candidate region 80 shown in FIG. 17A, i.e., region which is adjacent to the regions 80A, 80B, and 80C, is referred to as an edge element to be detected region 82. The edge element to be detected region is denoted by a hatched portion in FIG. 17B. Then, the edge detection processing is carried out to the edge element to be detected region 82, and as shown in FIG. 17C, an edge 84 (a portion which is painted over with black in FIG. 17C) is detected.

Next, edge detection processing will be explained. In the edge detection processing, information of color as well as brightness is taken into consideration. Accordingly, as shown in FIG. 18, a distance between the representative colors of a noticed FCR candidate $(R_x, G_x, B_x)$ and the pixel values of a color image having level P which is subjected to edge detection processing $(R_i, G_i, B_i)$ is obtained as an edge detection signal $\Delta_i$.

$$\Delta_i = \sqrt{(R_x - R_i)^2 + (G_x - G_i)^2 + (B_x - B_i)^2} \quad (1)$$

The edge pixels are detected by effecting the known edge detection technique, such as Sobel operation or the like, to the edge detection signal $\Delta_i$. When a portion, at which the edge pixels are not detected, is generated in the above-described processing, a contour portion of the region information 76 of the FCR candidate information 70 is determined as the edge of the region.

Due to the above-described processing, as shown in a hatched portion in FIG. 17D, an FCR 86 which serves as the ultimate uniform color region is extracted. In FIGS. 17A through 17D, description is given of a case in which the edge detection is carried out to the image which is lower than the image having level R by three levels. However, the present invention is not limited to the same. For example, the image having a level which is used at the edge detection may be an image having level 0 which has the same resolution as that of an input image. Further, if the edge image having level P which was used at the time of the aforementioned redetermination of the FCR is used, the processing can be simplified.

After the ultimate FCR 86 was determined in this way, a representative color selection processing is carried out (step 322). The selection of the representative color is effected, for example, by calculating the mean value of the pixel values of pixels within the FCR 86. The calculation of the mean value may be carried out using respective images of R, G, and B at level 0. Also, as illustrated in FIG. 19, the calculation may be carried out using, at a boundary portion 87 (portion shown by a hatched line in FIG. 19), pixel values of the image having a level which was subjected to the boundary detection and, at a central portion 89 (mesh portion) of the FCR 86 other than the boundary portion 87, pixel values of the image having a level at which the FCR candidate was extracted. In this way, it is possible to simplify the calculation to a large extent. Moreover, not only the mean value, but also a central value, i.e., an intermediate value between the smallest pixel value and the largest pixel value, may be used.

Further, FIG. 20 shows an example of results of measurement of color distribution of R, G, and B of the ultimate FCR 86. A frequency, i.e., the number of pixels, is shown on the axis of ordinates and a pixel value is shown on the axis of abscissas. As illustrated in FIG. 20, regarding the obtained results of measurement of color distribution, a color which does not satisfy a predetermined frequency (a position indicated as "Th" in FIG. 20), i.e., color which has a small number of pixels, is determined as a noise component and excluded from the object of calculation of the mean value. In this way, the mean value of each color R, G, and B is obtained and this will be the ultimate representative color of the FCR 86.

Further, in the calculation of the mean value, there is a tendency in general in which colors are mixed and muddiness is generated. Accordingly, a contrast enhancing processing using a correction table shown in FIG. 21 may be effected as an additional processing. Namely, as illustrated in FIG. 21, when the pixel value before correction is less than $X_1$, the pixel value becomes 0, when the pixel value before correction is more than $X_2$, the pixel value becomes 255 (i.e., the maximum value of the pixel values), and when the pixel value before correction falls within the range of $X_1$ to $X_2$, the pixel value becomes a pixel value multiplied by a predetermined coefficient. By effecting the correction in this way, color muddiness is reduced and an image having higher image quality can be obtained.

Then, a determination is made as to whether all of the FCRs are subjected to the above-described processing (step 323). If the entire processing ends, the representative color information of the representative color table shown in FIG. 13B is updated to the values of the representative color which was obtained as described above. In this way, the selection of the ultimate representative color ends.

The representative color is obtained in accordance with the above processing. However, for example, it is preferable that a color such as white or black in the document image is expressed in pure white or pure black by making each pixel value R=G=B=255 or R G=B=0. Moreover, in addition to white and black, it is often preferable that a color such as red or blue, which is frequently used in a document, is also expressed in pure red or pure blue by making each pixel value R=255, G=B=0 or R=G=0, B=255.

Then, a specific color processing for replacing a color which is close to a pure color with the pure color is carried out (step 324). In the specific color processing, the representative color table which was determined in the aforementioned representative color selection processing is referred. A distance in a color space between each representative color and a pure color, e.g., white, black, red, blue, green, yellow, magenta, cyan, or the like is obtained and compared to a predetermined threshold value. If the distance is smaller than the predetermined threshold value, it is determined that the representative color is a color which is close to the pure color. The representative color is thereby replaced with a pure color value of the pure color.

By effecting the specific color processing to all of the representative colors in this way, the FCR and the representative color are determined at the end. Then, the FCR information 70, shown in FIG. 15, which was ultimately determined is associated with the representative color numbers, and the FCR information 70 and the representative color numbers are stored in the image storing means 16 as an FCR table 90 which serves as an intermediate image.

Next, an image regeneration processing is carried out (step 330). Namely, the image regeneration is carried out as follows. The FCR table 90, which is formed by the FCR information 70 generated in the above processing and the representative color information of the representative color table 66, is referred, and image information to be written is generated. The image information is overwritten and drawn (synthesized) on an image having level 0, i.e., input image. For example, as shown in FIG. 22, if FCR regions 92A, 92B, and 92C exist, these regions are successively overwritten on the input image with the corresponding representative colors. By repeating the processing the number of FCR which was ultimately generated, the processing for enhancing uniformity of the FCR ends (steps 331 and 332).

As described above, in the present embodiment, the region which has substantially the uniform color is extracted using the image whose resolution is lower than that of the input image, and the color of the extracted region is replaced with the uniform color. Therefore, the quality of the image, such as a document image or the like, which has a region having a comparatively large surface area and substantially the uniform color can improve.

Second Embodiment

Next, a second embodiment of the present invention will be described. In the second embodiment, description will be given of a case in which detection of FCR and regeneration of color are carried out using two types of images, i.e., an input image, and an image which is generated by contracting the input image and has resolution which is lower than that of the input image.

Figure 23:
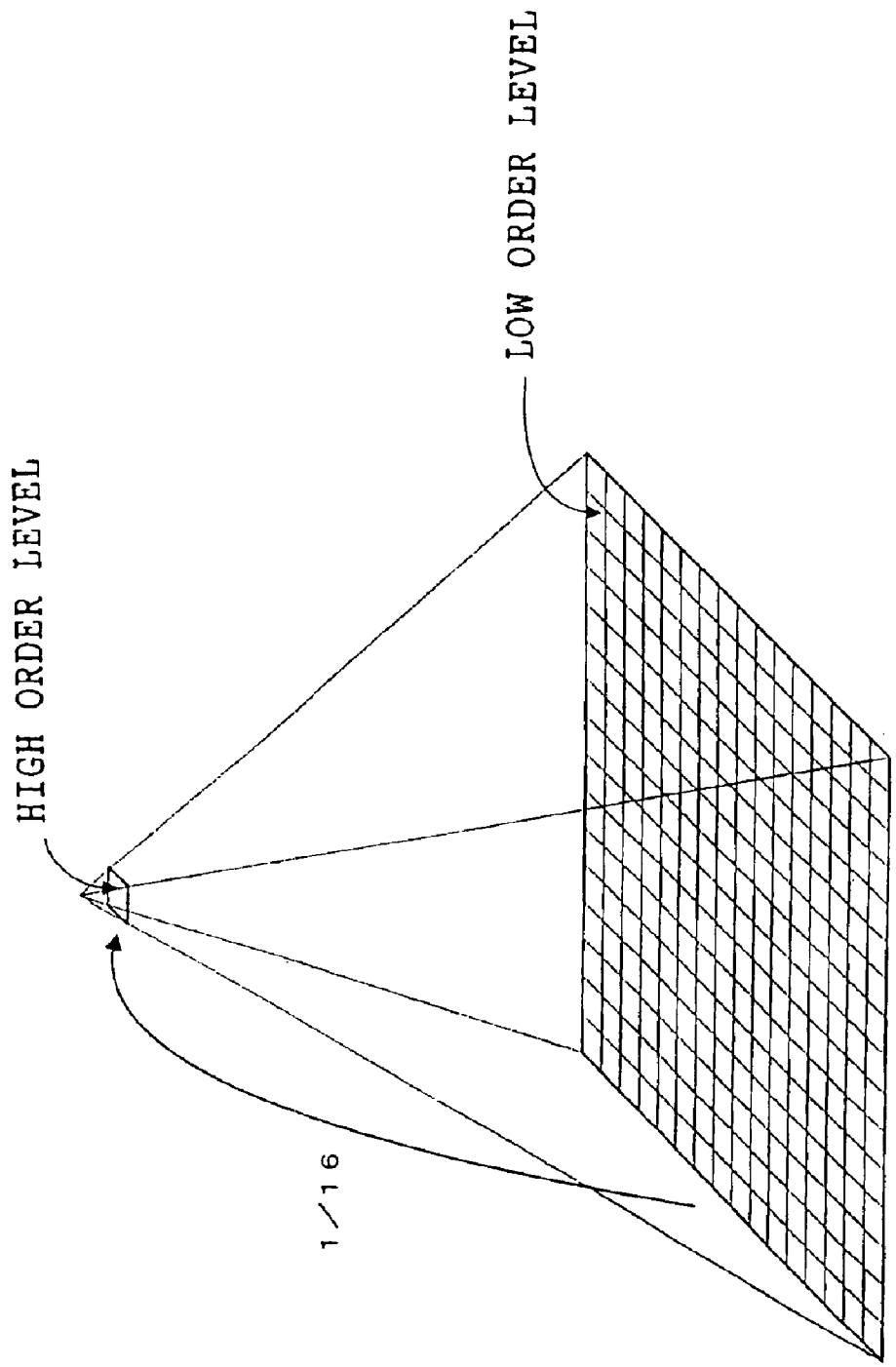
FIG. 23 is a view for explaining about resolution conversion.

In the present embodiment, only the images having two types of resolutions are handled. Thus, for the sake of convenience, the input image is referred to as "low order level image" and the image having low resolution which is generated by contracting the input image is referred to as "high order level image". As illustrated in FIG. 23, in the present embodiment, explanation will be given of a case in which an image which contracts the input image by ¹⁄₁₆ is used as a converted image having low resolution. However, the present invention is not limited to the same. Further, the detailed description of the processings which are the same as those explained in the first embodiment are omitted.

Figure 24:
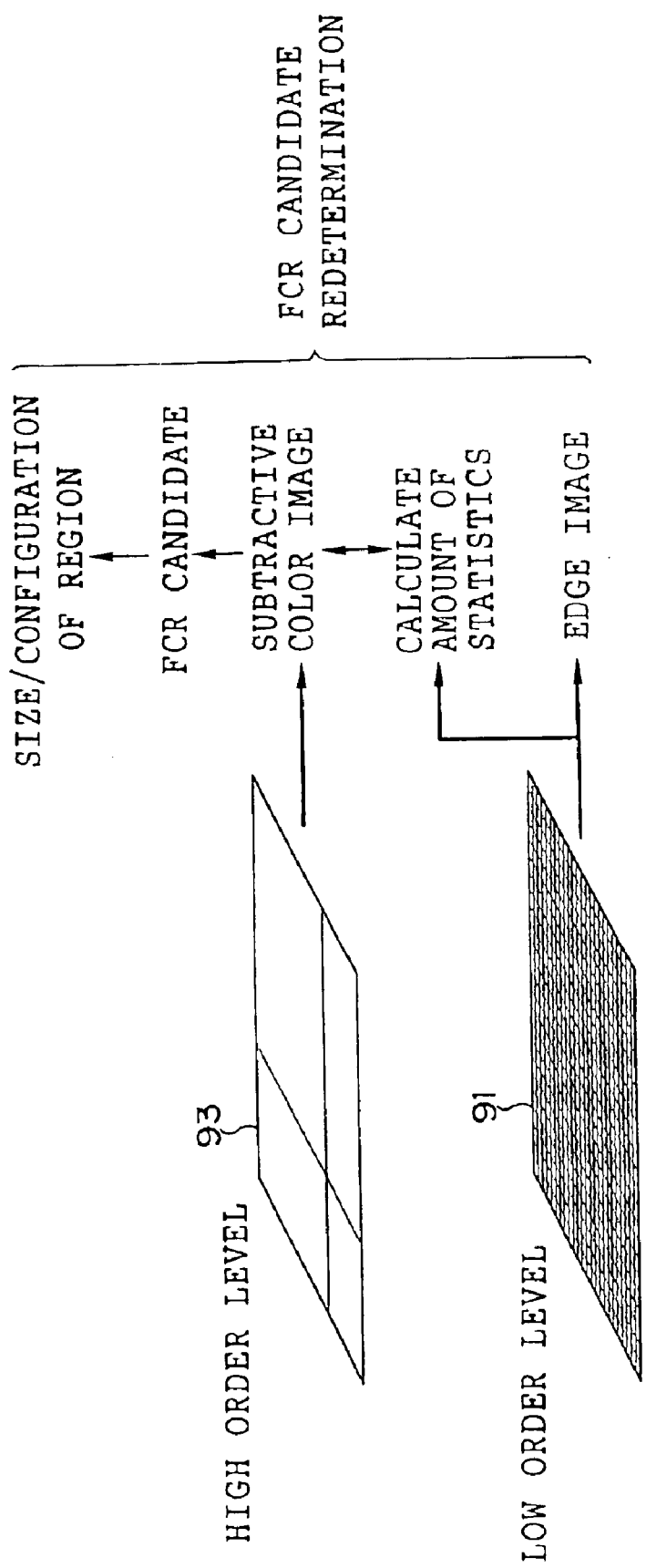
FIG. 24 is a view for explaining about a region redetermination processing.
Figure 25:
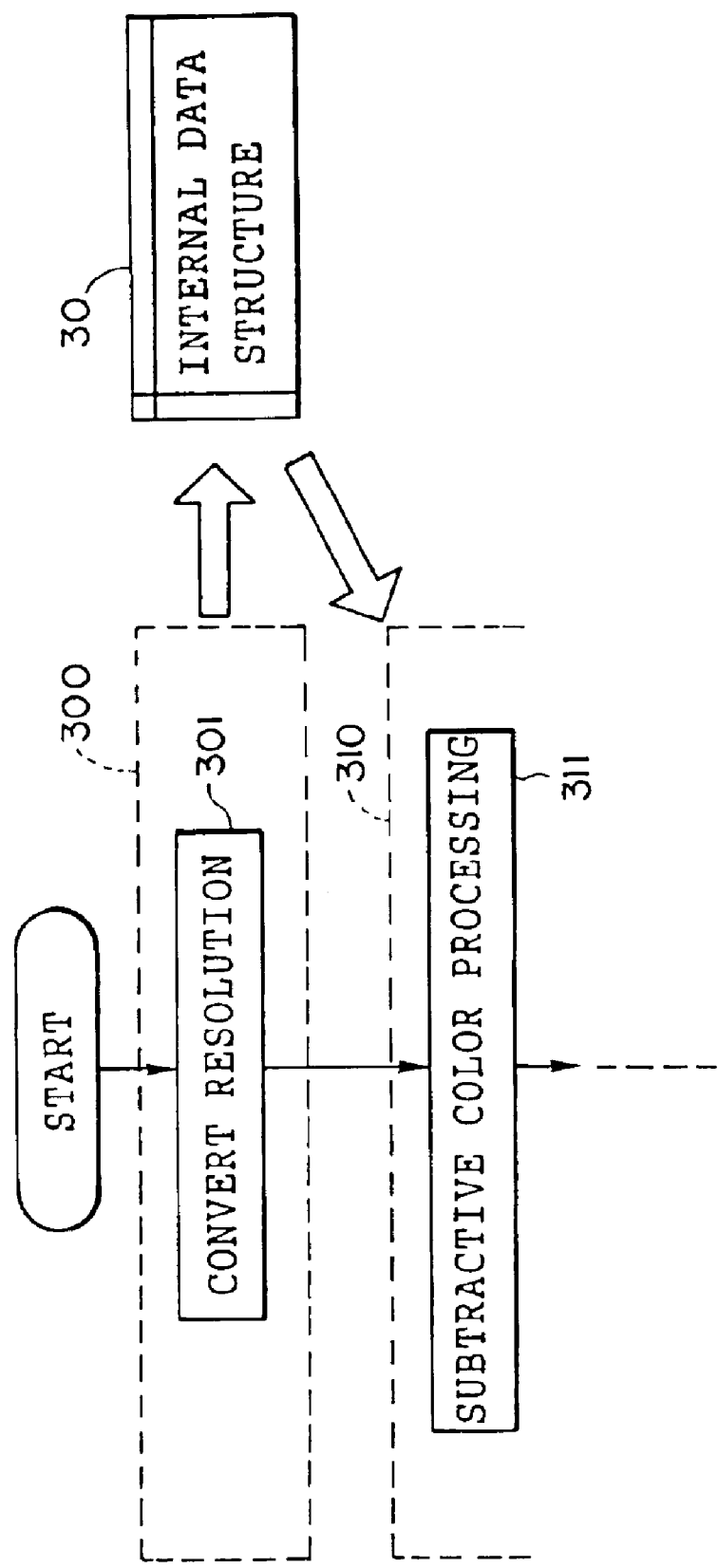
FIG. 25 is a flowchart which shows a portion of the flow of an image processing.

In the present embodiment, basically, the processings which are similar to the processings explained in the first embodiment and shown in FIGS. 6 and 7 are carried out. As illustrated in FIG. 24, there are two images which are used in the present embodiment (the number of levels is two), i.e., a low order level image 91 which is an input image and a high order level image 93 which has ¹⁄₁₆ resolution of the input image. Accordingly, as illustrated in FIG. 25, in a processing for converting a data structure (step 300), it suffices that a resolution converting processing (step 301) which contracts the input image at the magnification of ¹⁄₁₆ is effected only at once.

Figure 27:
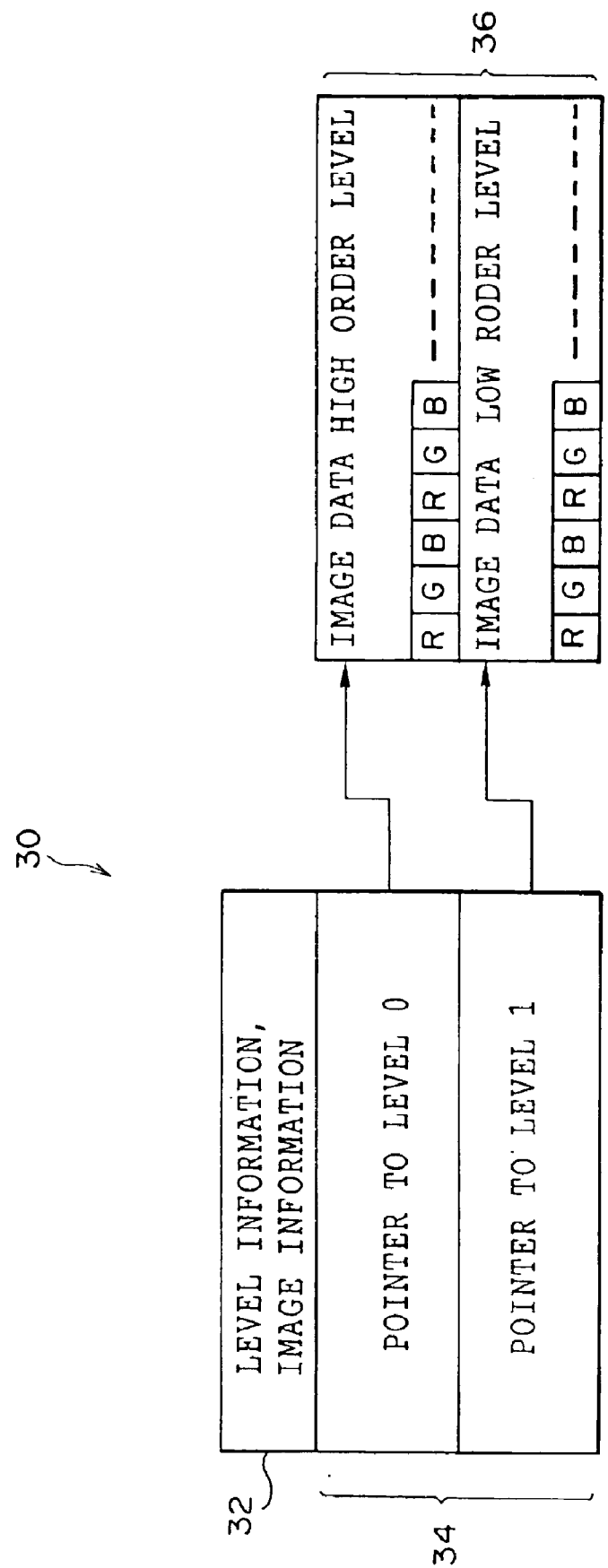
FIG. 27 is a view which shows the formation of an internal data structure.

As illustrated in FIG. 26, the contraction processing is carried out, for example, by calculating the mean value of 256 (=16×16) pixels. As a result, as shown in FIG. 27, an internal data structure 30 is generated. The internal data structure 30 is formed by a header information 32 and a pointer information 34 of the low order level (the level 0) image 91 and the high order level (the level 1) image 93.

Then, in the same way as in the first embodiment, in the FCR candidate extraction processing (step 310), the subtractive color processing (step 311) and the region candidate extraction processing (step 312) are carried out to the high order level image 93. Moreover, in the region candidate redetermination processing (step 313), the low order level image 91 is referred and the processing for redetermining the FCR candidate region is performed.

Next, the processing for redetermining the ultimate FCR and the representative color map (step 320) is carried out. The ultimate FCR is determined at the FCR boundary detection processing (step 321) which makes the configuration of the region which was generated at the high order level more precise and minute.

The FCR boundary detection processing is carried out as follows. Assuming that a region which is indicated by a hatched portion in FIG. 28A is an FCR candidate region 80 which was generated from the high order level image 93, an edge element at the boundary portion of the FCR candidate region 80 is detected using the low order level image 91 which has higher resolution. The boundary detection is thereby carried out. A region which is indicated by a hatched portion in FIG. 28B shows an edge element to be detected region 82. The edge element to be detected region 82 is a region of the edge portion of the FCR candidate region 80 shown in FIG. 28A, i.e., region which is adjacent to regions 80A, 80B, and 80C. By effecting the edge detection in the edge element to be detected region 82, an edge 84, as illustrated in FIG. 28C, is detected (a portion which is painted over with black in FIG. 28C). The edge detection is carried out in accordance with the processing which is the same as the one described in the above embodiment.

Due to the above-described processing, an ultimate FCR 86 as shown in FIG. 28D is extracted.

Figure 29:
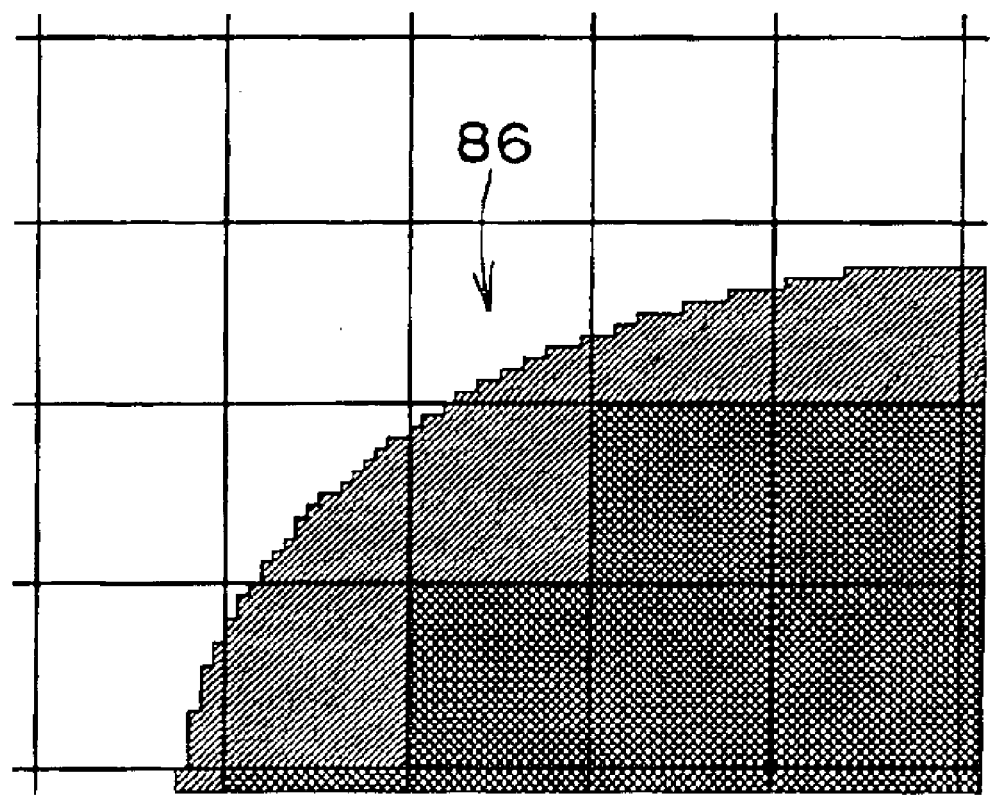
FIG. 29 is a view for explaining about a representative color selection processing of an FCR.

After the ultimate FCR 86 was determined, the representative color selection processing is performed (step 322). The selection of the representative color is effected, for example, by excluding a boundary portion of the ultimate FCR 86 from the representative value to be selected region. For example, when the representative color of the FCR 86 shown in FIG. 28D is recalculated, as illustrated in FIG. 29, the representative color is determined using only a region (mesh portion) of the FCR 86 other than a boundary portion (portion shown by a hatched line in FIG. 29). By selecting the representative color in this way, the representative color can be calculated using pixel values of the high order level image 93, and it is possible to simplify the representative color selection processing to a large extent.

The representative color selection is, for example, effected as follows. First, in the high order level image 93, as illustrated in FIG. 30, measurement of color distribution of each pixel R, G, and B in the region of the noticed FCR 86 other than the boundary region is carried out. Next, a central value of each distribution of R, G, and B (denoted by dotted lines in FIG. 30) is obtained, and the central value is determined to be a representative value. By effecting the processing to all of the FCR 86, the representative color selection ends.

Then, in the same way as in the previous embodiment, the specific color processing (step 324) and the image regeneration (step 331) are carried out, and then the present processing ends.

In this way, in the present embodiment, because the image processing is performed using only the images having two different types of resolutions, the processing time can be greatly reduced.

Third Embodiment

Next, a third embodiment of the present invention will be described. As described in the above embodiments, an object of the present invention is to improve the quality of a document image by enhancing the uniformity of the color of an FCR which is a region which has a large surface area and has substantially the same color.

Figure 31A:
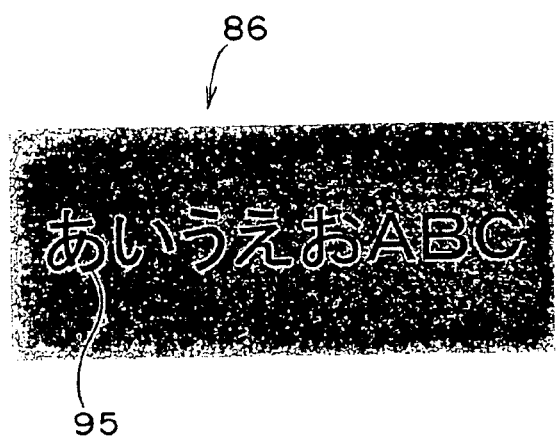
FIG. 31A is a view which shows an example of a document image which includes a document forming element.
Figure 31B:
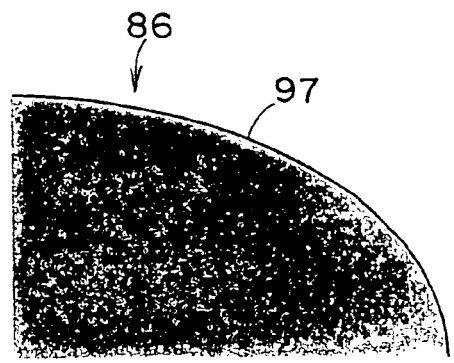
FIG. 31B is a view which shows an example of a document image which includes a segment element.

However, in the document image, for example, as shown in FIG. 31A, there is often a case in which a character 95, a table, a ruled line, or the like exists at the interior of the FCR 86. Alternately, as shown in FIG. 31B, there is often a case in which a boundary line 97 which edges the boundary of the FCR 86 exists.

Consequently, in the third embodiment, description is given of a case in which a high quality document image processing is effected by detecting a document forming element at the interior of the FCR 86 (hereinafter, "FCR containing element") and a segment element which edges the boundary of the FCR 86 (hereinafter, "FCR boundary element").

Figure 32:
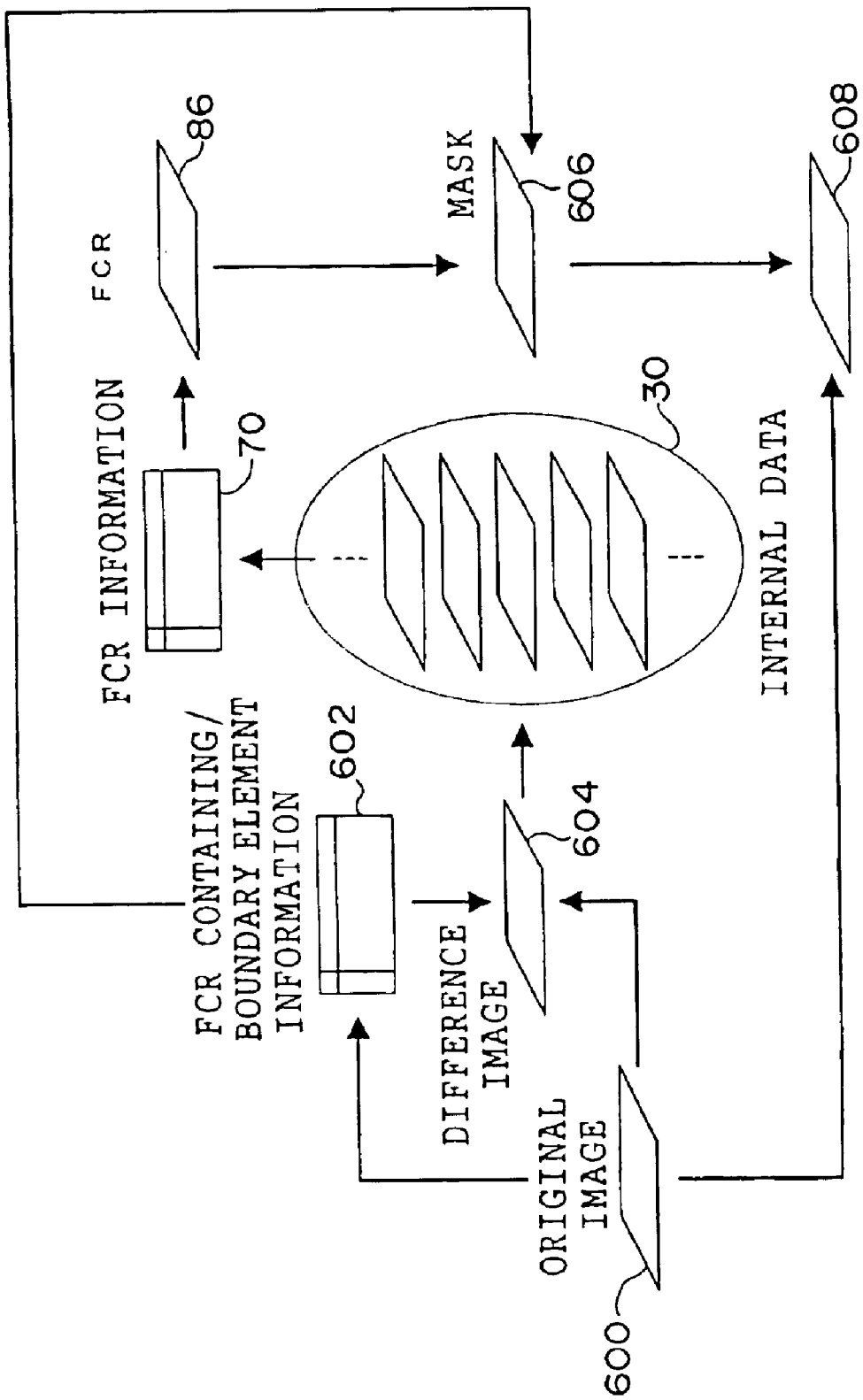
FIG. 32 is a view for explaining about the concept of an image processing.

First, a concept of the present processing will be described with reference to FIG. 32. As illustrated in FIG. 32, first, a processing for detecting an FCR containing element/boundary element information 602 from an original image 600 is effected, such that a difference image 604 between the original image 600 and the FCR containing element/boundary element information 602 is generated. Then, generation of an internal data structure 30, extraction of an FCR candidate information 70, and determination of an ultimate FCR 86 are carried out to the obtained difference image 604 in the same way as in the previous embodiments.

Then, the FCR 86 is written to the original image 600 using the FCR containing element/boundary element information 602 as a mask information 606. Regeneration of a document image 608 is thereby completed.

Figure 33:
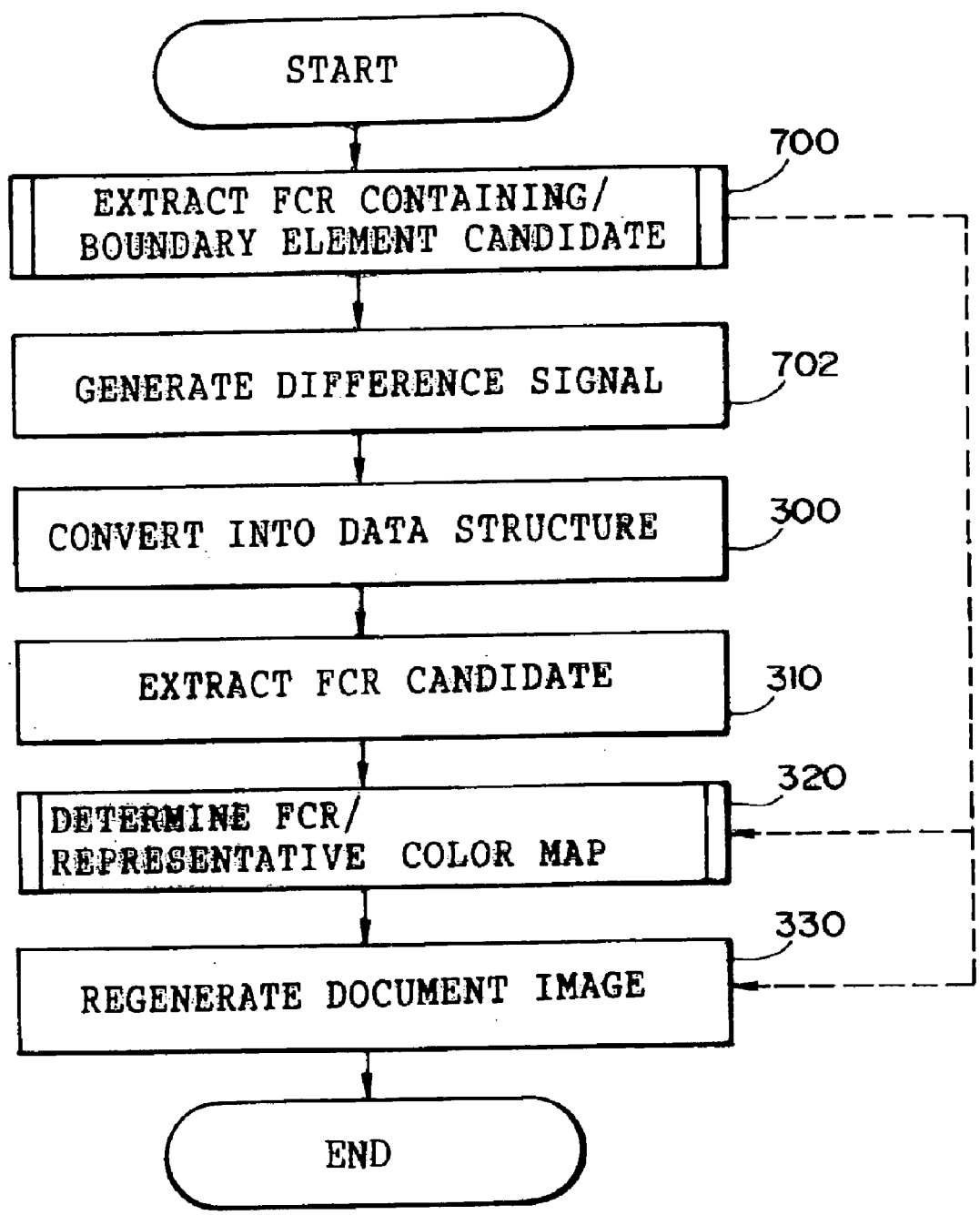
FIG. 33 is a flowchart which shows the flow of the image processing.

Next, a concrete processing will be described with reference to a flowchart shown in FIG. 33. The detailed description of processing which is the same as the processing described in the previous embodiments is omitted.

Figure 34:
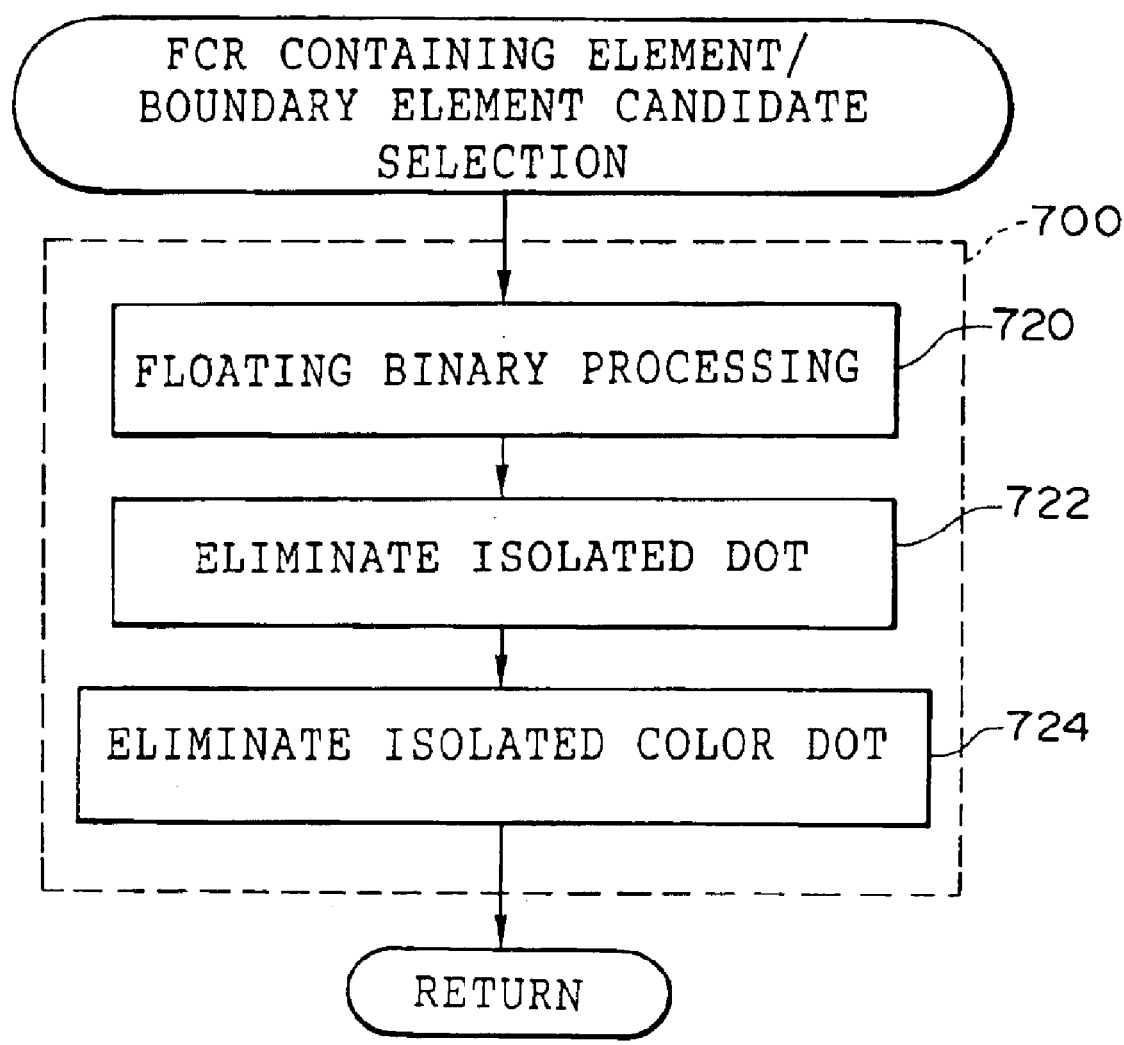
FIG. 34 is a flowchart which shows the flow of an FCR containing element/boundary element candidate extraction processing.

First, a document forming element and a segment element in the input image are detected and the FCR containing element/boundary element information 602 is extracted (step 700). There are several types of known methods of detecting the document forming element and the segment element. In the present embodiment, for example, as illustrated in FIG. 34, the detection of the document forming element and the segment element is carried out in accordance with a floating binary processing and a noise elimination processing. In the floating binary processing (step 720), the color of a noticed pixel and the mean color of peripheral pixels which center around the noticed pixel are compared. If the difference in colors exceeds a predetermined threshold value, the pixel is detected.

At this time, the region of peripheral pixels to be referred is set, for example, in accordance with the resolution of the input image or the width of the document forming element or the segment element which should be detected. However, as the present invention, when the enhancement of the uniformity of an FCR is a purpose, it is preferable that the range of reference increases to the degree which is not affected by dots or minute noise, e.g., from a 25 by 25 pixel region to a 51 by 51 pixel region.

Next, a processing for eliminating an isolated dot (step 722) is effected. The processing eliminates noise or dot components which were erroneously detected in the binary floatation. In a peripheral five by five pixel region of the detected noticed pixel, in the same way as in the noticed pixel, if the difference in colors between the noticed pixel and the peripheral pixel exceeds a predetermined threshold value, the pixel number of pixels which are detected as such is counted. If the counted number of pixels is smaller than the predetermined threshold value, the pixels are determined as isolated dots, i.e., noise or dot components, and thereby eliminated.

Next, a processing for eliminating an isolated color dot (step 724) is carried out. Similarly to the elimination of an isolated dot, the processing eliminates dot components which were erroneously detected in the floating binary processing. The color of the detected noticed pixel in the input image is compared to the color of the peripheral five by five pixel region in the input image. The number of pixels in which the difference falls within a predetermined threshold value is counted. If the counted number of pixels is smaller than the predetermined threshold value, the pixels are determined as isolated color dots, i.e., dot components, and thereby eliminated.

A binary image which is obtained in the above-described processings is stored/held in the image storing means 16 as the FCR containing element/boundary element information 602.

Figure 35:
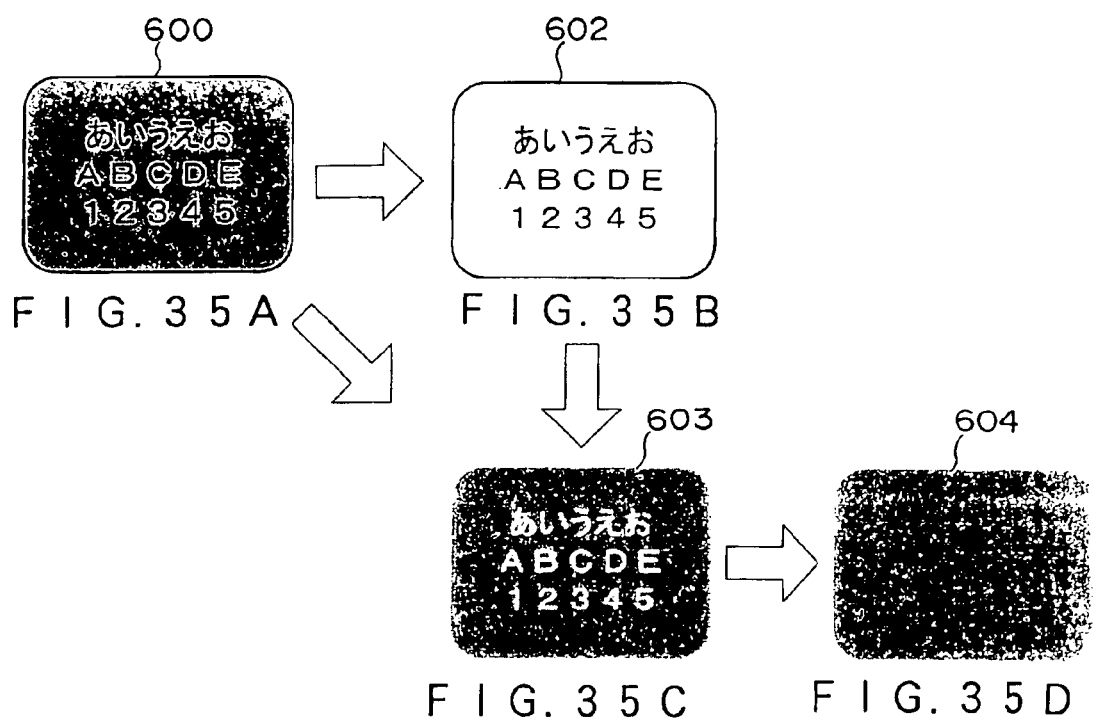
FIGS. 35A through 35D are views for explaining about the generation of a difference image.

Next, generation of the difference image 604 is carried out (step 702). FIG. 35A shows the original image 600 and FIG. 35B shows the FCR containing element/boundary element information 602 in which characters, line components, and the like are extracted from the original image. The FCR containing element/boundary element information 602 shown in FIG. 35B is removed from the original image 600, and then an image 603 as shown in FIG. 35C is generated. When a portion of the removed FCR containing element/boundary element information 602 is replaced with a value which interpolates from the pixel values of the peripheral pixels, the difference image 604 as shown in FIG. 35D is obtained.

As illustrated in FIG. 41A, when FCRs 86A, 86B, and 86C having three or more different colors abut an edge 84 which is an FCR containing element/boundary element, as shown in FIG. 41B, an image which removes the edge 84 is generated. Further, the pixels at a portion of the removed edge 84 are replaced with the pixel values of the FCRs 86A, 86B, and 86C, such that the difference image 604 is generated. This can be realized, for example, by enlarging the respective regions FCR 86A, 86B, and 86C outwardly, i.e., toward the central portion of the edge 84, and replacing the pixels of the edge 84 with the respective pixel values.

Then, in the same manner as in the previous embodiments, conversion of a data structure (step 300) and extraction of an FCR candidate (step 310) are carried out to the difference image 604.

Figure 36:
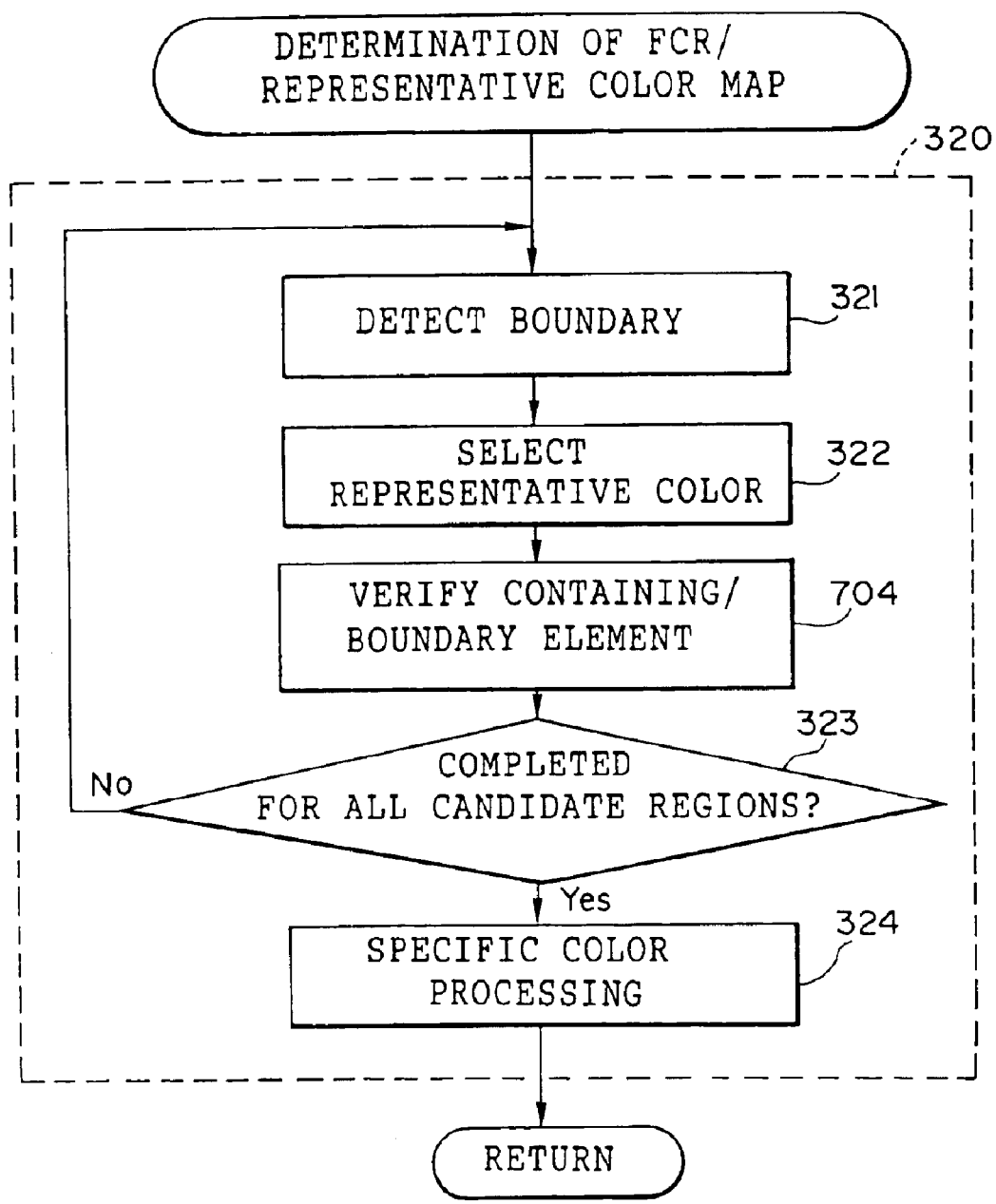
FIG. 36 is a flowchart which shows the flow of an FCR/representative color map determination processing.

Next, as illustrated in FIG. 36, a processing for determining an FCR/representative color map is carried out (step 320). Boundary detection (step 321), representative color selection (step 322), a specific color processing (step 324), which are illustrated in FIG. 36, are the same as the processings described in the previous embodiments, and the description thereof are omitted. A processing for verifying the FCR containing element/boundary element (step 704) which is effected after the representative color selection (step 322) will be described.

In the processing for verifying the FCR containing element/boundary element, the FCR containing element/boundary element, which is contained in the noticed FCR candidate, or the FCR containing element/boundary element, which abuts the noticed FCR candidate, is referred. The difference between the pixel value in the input image and the representative color which was determined in the representative color selection processing (step 322) is verified. If the difference in colors is smaller than a predetermined threshold value, it is determined that it is more suitable to process the FCR containing element/boundary element as the FCR 86. Thus, the FCR containing element/boundary element is excluded from the FCR containing element/boundary element information 602.

Finally, regeneration of the document image (step 330) is carried out in the same way as in the above embodiments. In the present embodiment, the FCR containing element/boundary element information 602 is used as the mask information 606 in the above-described regeneration processing. Namely, writing of the FCR 86 is effected while referring to the FCR containing element/boundary element 602. The representative color of the FCR 86 is written to the pixel which is not determined as the FCR containing element/boundary element. The representative color is not written to the pixel which is determined as the FCR containing element/boundary element, and the color information of the original image 600 is held.

Due to the above-described processings, it is possible to perform a good high quality processing to the document forming element illustrated in FIGS. 31A and the segment illustrated in FIG. 31B.

Fourth Embodiment

Next, a fourth embodiment of the present invention will be explained. In the present embodiment, description will be given of a case in which the FCR containing element/boundary element, which was described in the third embodiment and was used as a mask image, is subjected to a subtractive color processing.

Figure 37:
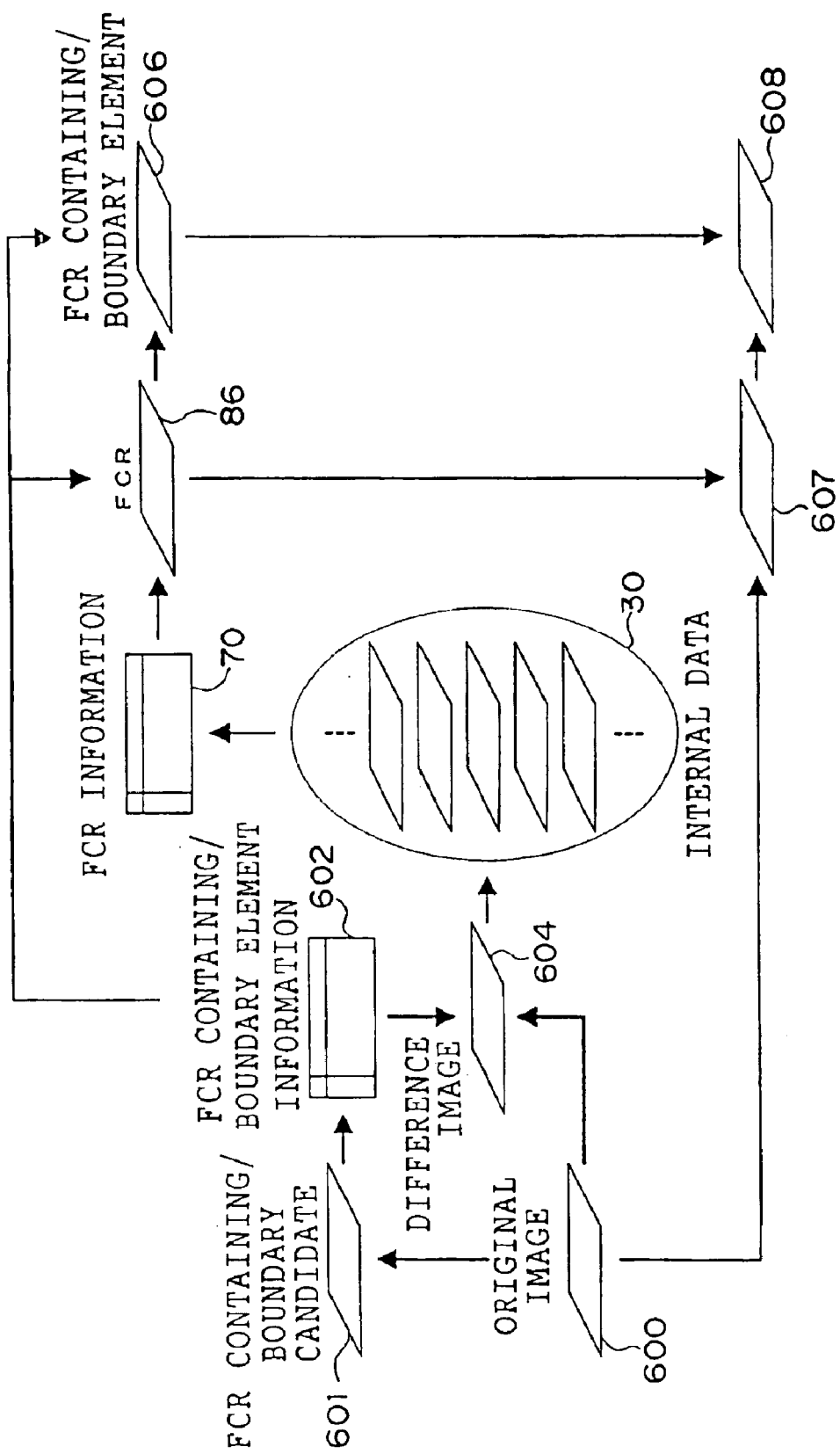
FIG. 37 is a view for explaining about the concept of an image processing.

First, a concept of the present processing will be explained with reference to FIG. 37. As illustrated in FIG. 37, in the present embodiment, first, an FCR containing element/boundary element candidate image 601 is detected from an original image 601. Next, the FCR containing element/boundary element candidate image 601 is subjected to the subtractive color processing. Accordingly, an FCR containing element/boundary element information 602 is generated, and a difference image 604 between the original image 600 and the FCR containing element/boundary element information 602 is generated. Then, the obtained difference image 604 is subjected to the processing which is the same as the one described in the third embodiment, and then generation of an internal data structure 30 and extraction of an FCR information 70 are carried out.

Then, matching ability between the FCR information 70 and the FCR containing element/boundary element information 602, which were obtained as described above, is verified. An FCR 86 for regeneration and an FCR containing element/boundary element 606 are generated, and an image 607, in which the FCR 86 is written to the original image 600, is generated (synthesized). Then, the FCR containing element/boundary element 606 is drawn (synthesized) on the image 607, such that a high quality document image 608 is obtained.

Next, the concrete processing will be explained with reference to flowcharts shown in FIGS. 38 and 39. The detailed description of the processings which are the same as those described in the previous embodiments is omitted.

Figure 38:
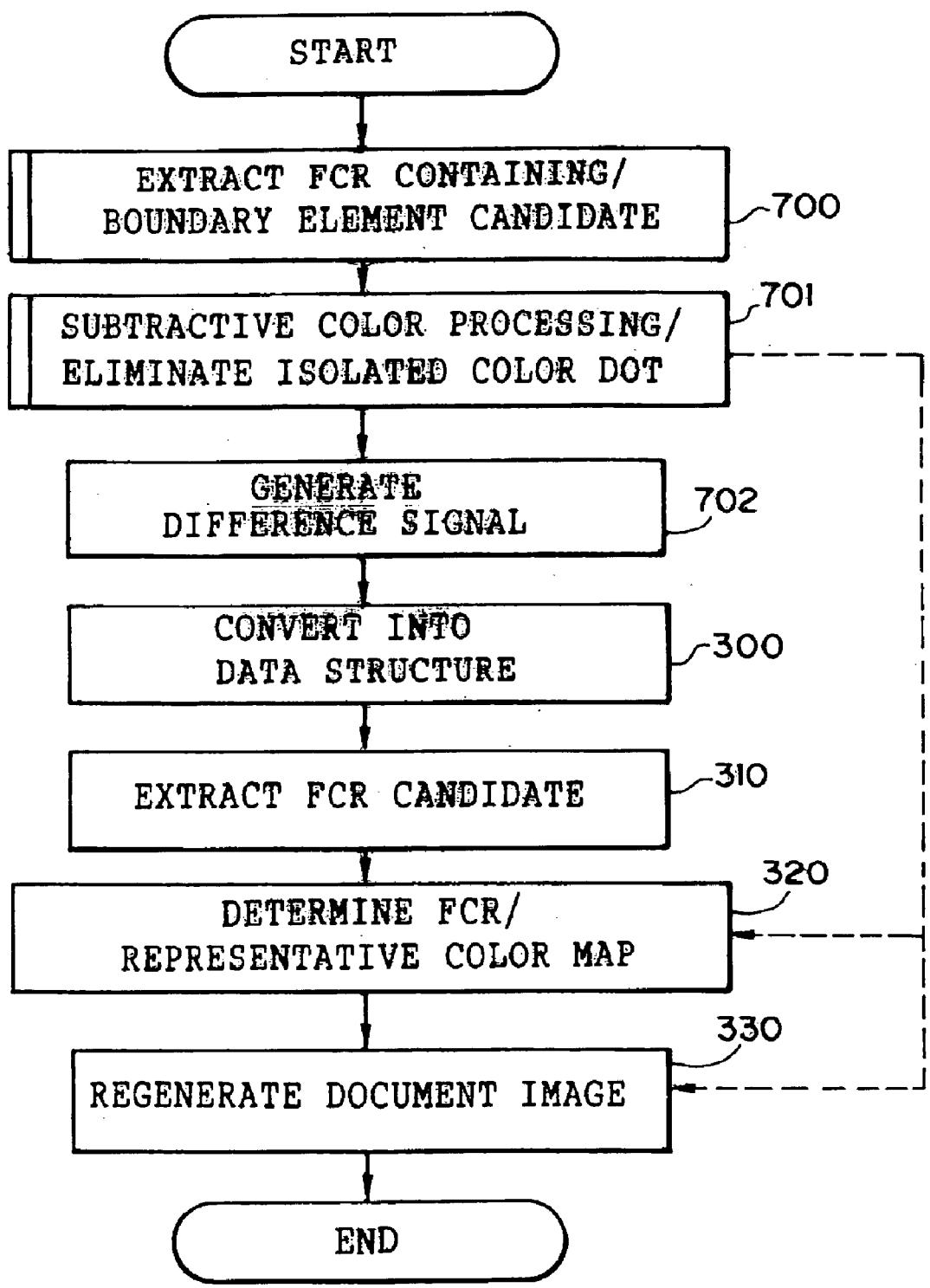
FIG. 38 is a flowchart which shows the flow of the image processing.
Figure 39:
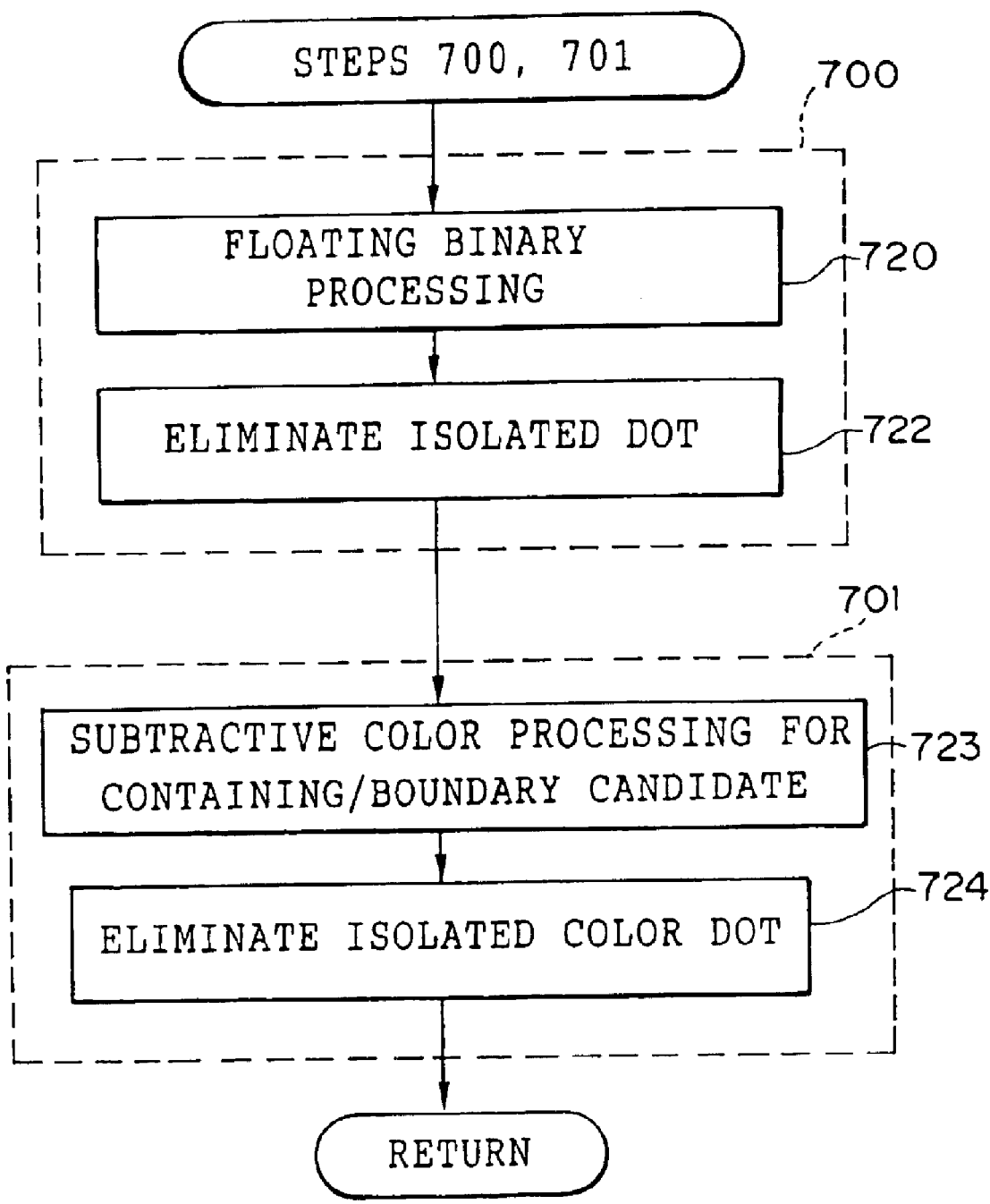
FIG. 39 is a flowchart which shows a portion of the flow of the image processing.

As illustrated in FIG. 38, first, a document forming element and a segment element in an input image are detected, and the FCR containing element/boundary element candidate information 601 is extracted (step 700). In the same manner as in the third embodiment, the document forming element and the segment element are detected in accordance with the floating binary processing and the noise elimination processing. Namely, as illustrated in FIG. 39, a floating binary processing (step 720) is effected, and then a processing for eliminating an isolated dot (step 722) is effected.

Next, the subtractive color processing and a processing for eliminating an isolated color dot are carried out (step 701). First, the subtractive color processing to the FCR containing element/boundary candidate 601 (step 723) is effected for the purpose of reducing dispersion of colors in the characters or segment elements which exist in the input image. The processing in step 701 corresponds to an eliminating means of the present invention.

The subtractive color processing is a processing which is the same as the processing of step 311 in FIG. 7, and the processing is carried out only to the pixel value of the FCR containing element/boundary element candidate 601. Next, a processing for eliminating an isolated color (step 724) is carried out in the same way as in the third embodiment. Namely, the color of a noticed pixel in the subtractive color image which was detected as an isolated dot is compared to the color of a peripheral five by five pixel region which centers around the noticed pixel in the input image. The pixel number of pixels in which the difference falls within a predetermined threshold value is counted. If the counted number of pixels is smaller than the predetermined threshold value, the pixels are determined as isolated color dots, i.e., dot components, and thereby eliminated.

The FCR containing element/boundary element information 602 which is obtained in the above processing is stored/held in the image storing means 16 in the form of an image data having structures shown in FIGS. 13A through 13C.

Next, in the same manner as in the third embodiment, generation of the difference image 604 (step 702), conversion of a data structure (step 300), extraction of the FCR candidate 70 (step 310), and a processing for determining an FCR/representative color map (step 320) are carried out. Because the boundary detection (step 321), the representative color selection (step 322), and the specific color processing (step 324), which are illustrated in FIG. 36, are the same as those described in the previous embodiments, the description thereof is omitted. A processing for verifying the FCR containing element/boundary element (step 704) which is effected after the representative color selection (step 322) will be described.

In the processing for verifying the FCR containing element/boundary element, the FCR containing element/boundary element, which is contained in the noticed FCR candidate, or the FCR containing element/boundary element, which abuts the noticed FCR candidate, is referred. The difference between the pixel value in the input image and the representative color which was determined in the representative color selection processing (step 322) is verified. If the difference in colors is smaller than a predetermined threshold value, it is determined that it is more suitable to process the FCR containing element/boundary element as the FCR 86. Thus, the FCR containing element/boundary element is thereby excluded from the FCR containing element/boundary element information 602.

Further, in the present embodiment, correction of the boundary of the FCR 86 is carried out. The correction will be described with reference to FIGS. 40A through 40E. FIG. 40A shows an edge 84 (pixels which are painted with black in FIG. 40A). The edge 84 is an FCR containing element/boundary element 606 which was generated in accordance with the aforementioned segment detection, noise elimination, subtractive color processing, or the like (steps 700 and 701). A hatched portion in FIG. 40B shows the FCR 86 which was generated in the boundary detection processing (step 321). These two regions are respectively detected in accordance with different processes. Accordingly, when the quality of the input image is low and the image includes a large number of noise, or in an area where it is difficult to carry out segment detection/boundary detection, such as a region having dot components and a texture structure, a mismatch may arise. Hereinafter, the mismatch will be explained.

In the present embodiment, as shown in FIG. 37, the FCR 86 is written on the original image (the input image) 600, and the image 607 is generated. The FCR containing element/boundary element 606 is drawn (synthesized) on the image 607, and thereby the ultimate document image 608 is obtained. At this time, as illustrated in FIGS. 40A and 40B, if there is a mismatch at the time of detection of the FCR 86 and the edge 84, a clearance is generated therebetween as shown in FIG. 40C.

Pixels, which are expressed in white in the vicinity of a boundary between the FCR 86 and the edge 84, hold pixel values of the input image. In the third embodiment, the FCR containing element/boundary element information 602 is used as the mask information 606. The present embodiment is different from the case of the third embodiment. Because the uniformity of the FCR 86 and the FCR containing element/boundary element 606 is enhanced in the subtractive color processing, the mismatching pixels may deteriorate the quality of the image depending on the held pixel values of the input image or the representative color which is determined in the process of the subtractive color processing. Accordingly, in the present embodiment, when the boundary element such as the edge 84 or the like exists at the FCR 86, as illustrated in FIG. 40D, a processing which expands the FCR 86 to the boundary element is carried out. Namely, the pixels which exist at the clearance between the FCR 86 and the edge 84 are replaced with a color of the FCR 86.

The FCR 86 which is obtained in the above-described processing is written on the input image, and further, the FCR containing element/boundary element 606 is overwritten thereon. Accordingly, as illustrated in FIG. 40E, the document image 608 without any mismatches is regenerated (step 330).

Figures 42A, 42B:
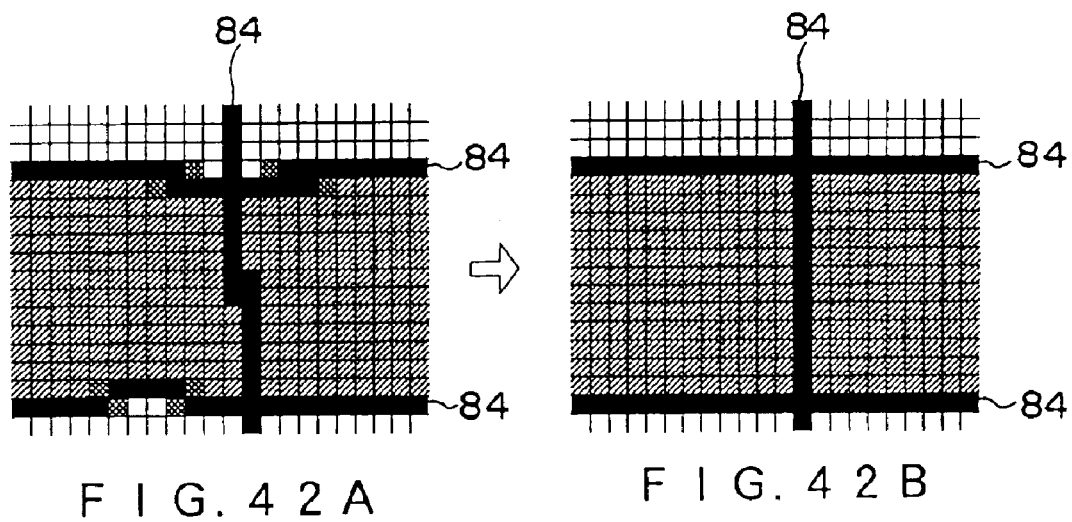
FIGS. 42A and 42B are views for explaining about vector-raster conversion of a segment element.

It is possible that the detected segment element may become vector by known vector conversion and returned to raster data again by known raster conversion. In this way, as illustrated in FIG. 42A, even if an edge 84 which should be originally denoted by a straight line is distorted by noise or the like at the time of image input, as illustrated in FIG. 42B, the edge 84 can be returned to a straight line as in the original image.

In accordance with the above processing, for example, it is possible to reduce a drawback in which, due to the pixels, the hue of a red character which exists in a document image is subtly deviated in an orange direction or a magenta direction, or the color shading thereof is dark or light. Further, the effects of the processing most strikingly appear on a black character or a black line in the document. In the subtractive color processing described in the above embodiment, an example is desired of a case in which the pixels are unified with the highly frequent color on the basis of the color distribution of the original image. However, for example, by effecting a processing which is limited to a specific color such as extracting only the FCR containing element/boundary element in the vicinity of a black region, the quality of a black character which is included in an FCR or the quality of a black line which forms a ruled line and the boundary of the FCR can be effectively improved by the processing which is simpler than the aforementioned subtractive color processing.

As described above, the present invention has a superior effect in that, even if an image such as a document image, which has a comparatively large surface area and has a great number of same color regions, is scan-read, the image quality of the read image can improve.

What is claimed is:

1. An image processing apparatus, comprising:
   an image generating unit which generates, from an input image which has been read at a resolution determined in advance by an image reading unit which scan-reads an image, at least one converted image having a resolution which is lower than the resolution of the input image;
   a candidate region setting unit which determines at least one region having substantially uniform color as a candidate color region from the converted image having low resolution; and
   a processing unit which, on the basis of the candidate color region and an image having a resolution which is higher than the resolution of the converted image having low resolution, generates an intermediate image which includes at least one region which has substantially uniform color as a uniform color region and has substantially the same resolution as the input image, and said processing unit processes the input image on the basis of the generated intermediate image.

2. An image processing apparatus according to claim 1, wherein said image generating unit generates the one converted image having low resolution, and the image having high resolution is the input image.

3. An image processing apparatus according to claim 1, wherein said candidate region setting unit measures a color distribution of the converted image having low resolution, said candidate region setting unit includes a subtractive color image generating unit which generates a subtractive color image on the basis of the measured color distribution by excluding pixels of a color having a small number of pixels, and said candidate region setting unit determines at least one region having substantially uniform color as a candidate color region on the basis of the generated subtractive color image.

4. An image processing apparatus according to claim 1, wherein said candidate region setting unit redetermines the candidate color region on the basis of at least one of a size, a configuration, and an aspect ratio of the candidate color region.

5. An image processing apparatus according to claim 1, wherein said candidate region setting unit obtains a correlation between the color of the candidate color region and the color of a region in the image having high resolution which region corresponds to the candidate color region, and said candidate region setting unit redetermines the candidate color region on the basis of the obtained correlation.

6. An image processing apparatus according to claim 5, wherein the correlation is a standard deviation.

7. An image processing apparatus according to claim 1, wherein said processing unit detects an edge of the region in the image having high resolution which region corresponds to a candidate color region, and said processing unit sets the region which is surrounded by the detected edge as the uniform color region.

8. An image processing apparatus according to claim 1, wherein said processing unit obtains a mean value of pixel values in the uniform color region and sets the obtained mean value as a color of the uniform color region.

9. An image processing apparatus according to claim 8, wherein said processing unit excludes pixels of the uniform color region when the number of pixels in the uniform color region is smaller than a predetermined number and obtains the color of the uniform color region.

10. An image processing apparatus according to claim 8, wherein said processing unit replaces the color of the uniform color region with a predetermined pure color which has been determined in advance.

11. An image processing apparatus according to claim 1, wherein said processing unit obtains a central value of pixel values in the uniform color region and sets the obtained central value as the color of the uniform color region.

12. An image processing apparatus according to claim 1, further comprising:

a segment element extracting unit which extracts a segment element from the input image; and a difference image generating unit which generates a difference image in which the segment element is excluded from the input image, wherein said image generating unit generates, from the difference image, at least one converted image having a resolution which is lower than the resolution of the difference image, and said processing unit processes the input image on the basis of the extracted segment element and the intermediate image.

13. An image processing apparatus according to claim 12, wherein said difference image generating unit replaces pixels in a region of the excluded segment element in the difference image with pixel values based on peripheral pixels of the segment element.

14. An image processing apparatus according to claim 12, further comprising:

an eliminating unit which measures a color distribution of the segment element, and generates a subtractive color image of the segment element on the basis of the measured color distribution by excluding pixels of a color having a small number of pixels, and eliminates pixels of an isolated color in the segment element on the basis of the generated subtractive color image.

15. An image processing apparatus according to claim 12, wherein said segment element extracting unit extracts a segment element having a specific color which has been determined in advance.

16. A computer readable recording medium on which a program for executing processings is recorded, said program comprising the steps of:

generating, from an input image which has been scan-read at a resolution determined in advance, at least one converted image having a resolution which is lower than the resolution of the input image;

determining at least one region having substantially uniform color as a candidate color region from the converted image having low resolution; and on the basis of the candidate color region and an image having a resolution which is higher than the resolution of the converted image having low resolution, generating an intermediate image which includes at least one region having substantially uniform color as a uniform color region and which has substantially the same resolution as the input image, and processing the input image on the basis of the generated intermediate image.

* * * * *